(12) United States Patent
Williams et al.

(10) Patent No.: US 12,073,010 B2
(45) Date of Patent: Aug. 27, 2024

(54) VR ENVIRONMENT FOR ACCIDENT RECONSTRUCTION

(71) Applicant: STATE FARM MUTUAL AUTOMOBILE INSURANCE COMPANY, Bloomington, IL (US)

(72) Inventors: Aaron Williams, Congerville, IL (US); Joseph Robert Brannan, Bloomington, IL (US); John Donovan, Bloomington, IL (US); Brian N. Harvey, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 10 days.

(21) Appl. No.: 17/874,227

(22) Filed: Jul. 26, 2022

(65) Prior Publication Data
US 2024/0004457 A1    Jan. 4, 2024

Related U.S. Application Data

(60) Provisional application No. 63/358,002, filed on Jul. 1, 2022.

(51) Int. Cl.
*G06F 3/01*     (2006.01)
*G06T 11/00*    (2006.01)
*G08G 1/16*     (2006.01)

(52) U.S. Cl.
CPC .............. *G06F 3/011* (2013.01); *G06T 11/00* (2013.01); *G08G 1/162* (2013.01)

(58) Field of Classification Search
None
See application file for complete search history.

(56) References Cited

U.S. PATENT DOCUMENTS 8,335,644 B2    12/2012    Kimura
9,555,803 B2    1/2017     Pawlicki et al.
(Continued)

FOREIGN PATENT DOCUMENTS

CN    105751960 A    7/2016
CN    114667474 A    6/2022
(Continued)

OTHER PUBLICATIONS

Non-final Office Action, U.S. Appl. No. 17/874,096, mailed Feb. 9, 2023.
(Continued)

*Primary Examiner* — Ryan M Gray
(74) *Attorney, Agent, or Firm* — MARSHALL, GERSTEIN & BORUN LLP

(57) ABSTRACT

The following relates generally to providing virtual reality (VR) alerts to a driver of an autonomous vehicle. For example, a vehicle may be driving autonomously while the driver is watching a VR movie (e.g., on a pair of VR goggles); the driver may then receive a VR alert recommending that the driver take control of the vehicle (e.g., switch the vehicle from autonomous to manual mode). The following also relates to generating a VR feed for presenting real-time road conditions so that a user may preview a road segment. The following also relates to generating a VR feed corresponding to an event (e.g., a vehicle collision, a crime, a weather event, and/or a natural disaster).

18 Claims, 21 Drawing Sheets

(56) References Cited

U.S. PATENT DOCUMENTS

| | | |
|---|---|---|
| 9,712,741 B2 | 7/2017 | Kothari |
| 9,830,748 B2 | 11/2017 | Rosenbaum |
| 9,990,782 B2 | 6/2018 | Rosenbaum |
| 10,269,190 B2 | 4/2019 | Rosenbaum |
| 10,306,303 B2 | 5/2019 | Bhageria et al. |
| 10,462,426 B2 | 10/2019 | Schofield et al. |
| 10,467,824 B2 | 11/2019 | Rosenbaum |
| 10,637,683 B2 | 4/2020 | Funk et al. |
| 10,732,627 B1 | 8/2020 | Roberson et al. |
| 11,227,452 B2 | 1/2022 | Rosenbaum |
| 11,407,410 B2 | 8/2022 | Rosenbaum |
| 11,524,707 B2 | 12/2022 | Rosenbaum |
| 11,594,083 B1 | 2/2023 | Rosenbaum |
| 2008/0051997 A1 | 2/2008 | Rosenberg |
| 2010/0097240 A1 | 4/2010 | Soulchin et al. |
| 2010/0207751 A1 | 8/2010 | Follmer et al. |
| 2011/0166777 A1 | 7/2011 | Chavakula |
| 2014/0247160 A1* | 9/2014 | Glascock ............... G08G 1/095 340/907 |
| 2014/0327772 A1 | 11/2014 | Sahba |
| 2015/0035862 A1* | 2/2015 | Fischer ................. H04N 23/90 345/633 |
| 2016/0054452 A1 | 2/2016 | Cosatto et al. |
| 2016/0054735 A1* | 2/2016 | Switkes ................... G08G 1/22 701/23 |
| 2016/0075332 A1 | 3/2016 | Edo-Ros |
| 2016/0163063 A1 | 6/2016 | Ashman |
| 2016/0193961 A1 | 7/2016 | Fischer et al. |
| 2017/0264890 A1 | 9/2017 | Gorilovsky et al. |
| 2017/0294135 A1 | 10/2017 | Lechner |
| 2018/0061138 A1 | 3/2018 | Neeter |
| 2018/0239948 A1* | 8/2018 | Rutschman ............... G06T 7/20 |
| 2018/0279032 A1 | 9/2018 | Boesen |
| 2018/0308024 A1 | 10/2018 | Kilner et al. |
| 2018/0311085 A1 | 11/2018 | Lacaze et al. |
| 2018/0374268 A1 | 12/2018 | Niles |
| 2019/0043201 A1* | 2/2019 | Strong ................... G06V 10/96 |
| 2019/0043351 A1* | 2/2019 | Yang ................ G06F 18/24133 |
| 2019/0107845 A1 | 4/2019 | Kaine |
| 2019/0108768 A1 | 4/2019 | Mohamed |
| 2019/0187876 A1 | 6/2019 | Platt et al. |
| 2020/0003902 A1* | 1/2020 | Lee ...................... G01S 17/931 |
| 2020/0086806 A1 | 3/2020 | Cha |
| 2020/0128178 A1 | 4/2020 | Shi |
| 2020/0258306 A1* | 8/2020 | Forutanpour ............. G06T 9/00 |
| 2020/0264003 A1 | 8/2020 | Ebner et al. |
| 2020/0339160 A1 | 10/2020 | Rosenbaum |
| 2020/0372791 A1 | 11/2020 | Li et al. |
| 2021/0133929 A1* | 5/2021 | Ackerson ............. G06T 3/4092 |
| 2021/0237645 A1 | 8/2021 | Farrell et al. |
| 2021/0248822 A1* | 8/2021 | Choi .................... G02B 27/017 |
| 2021/0387821 A1 | 12/2021 | Kinzler |
| 2022/0020230 A1* | 1/2022 | Tal ....................... G08G 1/0133 |
| 2022/0065648 A1 | 3/2022 | Suleiman Ahmad Almousa |
| 2022/0065651 A1* | 3/2022 | Beaurepaire ............ G06T 11/60 |
| 2022/0092893 A1 | 3/2022 | Rosenbaum |
| 2022/0340148 A1 | 10/2022 | Rosenbaum |
| 2022/0397686 A1* | 12/2022 | Scacchi ................. G01S 19/485 |
| 2023/0060300 A1 | 3/2023 | Rosenbaum |
| 2023/0345100 A1* | 10/2023 | Reading ................... G02B 5/28 |

FOREIGN PATENT DOCUMENTS

| | | |
|---|---|---|
| EP | 3239686 A1 | 11/2017 |
| EP | 3578433 B1 | 8/2020 |
| EP | 3730375 B1 | 10/2021 |
| EP | 3960576 A1 | 3/2022 |
| EP | 4190659 A1 | 6/2023 |
| EP | 4190660 A1 | 6/2023 |

OTHER PUBLICATIONS

A. Javaheri et al., "Emerging Space Brief: Digital Twins" PitchBook, Jun. 8, 2023.

Non-Final Rejection Mailed on Apr. 24, 2024 for U.S. Appl. No. 18/238,219, 10 page(s).

* cited by examiner

VR ENVIRONMENT FOR ACCIDENT RECONSTRUCTION

CROSS REFERENCE TO RELATED APPLICATIONS

This application claims the benefit of U.S. Provisional Application No. 63/358,002, entitled "Generating Virtual Reality (VR) Alerts for Challenging Streets" (filed Jul. 1, 2022), the entirety of which is incorporated by reference herein.

FIELD

The present disclosure generally relates to, inter alia: (i) providing virtual reality (VR) alerts to a driver of an autonomous vehicle; (ii) generating a VR feed for presenting real-time road conditions; and (iii) generating a VR feed corresponding to an event.

BACKGROUND

In some scenarios, the driver of an autonomous vehicle may be watching a VR movie while the vehicle is driving autonomously. However, that the driver is watching a VR movie presents a problem when the vehicle approaches an area where the driver should take control of the vehicle (e.g., an area where it would be difficult for the vehicle to drive autonomously).

In other scenarios, for a person who is determining whether or not to take an upcoming trip, it may be useful to know the road conditions on upcoming portions of a potential route to a destination. However, it may be difficult and/or cumbersome for the person to learn the road conditions prior to embarking on the trip.

In still other scenarios, for the person who is determining whether or not to take the upcoming trip, it may be useful to know if an event (e.g., a vehicle collision, a crime, a weather event, or a natural disaster) has occurred in a geographic area of the trip. However, it may be difficult and/or cumbersome for the person to learn if an event has occurred, and also difficult and/or cumbersome to obtain information of the event.

The systems and methods disclosed herein provide solutions to these problems and may provide solutions to other drawbacks of conventional techniques.

SUMMARY

In general, first, the present embodiments may relate to, inter alia, generating Virtual Reality (VR) alerts for challenging streets. For instance, a VR environment may be provided in which VR alerts are generated for challenging streets or areas for delivery drivers/passengers, truck drivers/passengers, or other vehicles. The environment provides audible or visual alerts for the driver to pay attention in certain areas. As an example, an alert may interrupt a viewing of movie or playing of a video game using a VR headset, to alert the passenger that the Autonomous Vehicle (AV) is approaching construction, congestion, an accident, or tight city streets and the passenger should take manual control of the AV. The VR environment may also provide for VR driver training for the challenging streets/areas. For instance, virtual street/driving training of scenes of tight city streets may be provided via a VR headset prior to the driver traveling to that area of the city.

Second, the present embodiments may relate to, inter alia, a VR environment for presenting real-time road conditions, such as on an AR (Augmented Reality)/VR headset or AR/VR display. The VR environment may live-stream what current weather/road or traffic conditions look like from the perspective of other drivers (e.g., gather feeds from smart glasses, AR or VR glasses/headsets, smart vehicle cameras, and post the images on the internet or for viewing on a VR headset). A user may go into the Metaverse or other virtual environment, and preview roads for driving along predetermined routes and/or in certain difficult areas based on sensor data and/or images from vehicles in that area. For instance, if the user is going to travel from Denver to Cheyenne in winter and snow is forecasted, or driving into Chicago, allow the user to view current road and traffic conditions. In certain embodiments, a VR headset or smart windshield may also be able to display road conditions from vehicles directly ahead of the user, e.g., collect and display images from vehicles or passengers traveling a few miles ahead and along the same route of the user.

Third, the present embodiments may relate to, inter alia, a VR environment for accident reconstruction. A VR environment may be provided for representing a real-time view of a certain geographical area where users can go in and experience what is happening in the area. This may include real-time viewing of an accident scene, crime scene, or other real-time event. The scene may include real-time weather conditions or natural disaster conditions (e.g., forest fires, hurricanes) which may be provided from sensors or cameras within the area (e.g., vehicle sensors, infrastructure sensors, drones, etc.). For privacy reasons, the VR environment may blur out individuals (e.g., mask faces) within the scene, license plates, or other identifying information, or replace with the individuals with generic avatars. The VR environment may also provide a more photorealistic stream of individuals to emergency services to show the extent of injuries from the event.

More specifically, in one aspect, a computer-implemented method for providing virtual reality (VR) alerts to a driver of an autonomous vehicle may be provided. The method may be implemented via one or more local or remote processors, transceivers, sensors, servers, virtual headsets or displays, and/or other electric or electronic components. In one instance, the method may include: (1) receiving, via one or more processors, an indication that a driver of a vehicle is accessing a VR feed on a VR display; (2) receiving, via the one or more processors, an indication that the vehicle is driving in an autonomous mode; (3) determining, via the one or more processors, a complexity score for traversing an upcoming area which the vehicle is approaching; and/or (4) in response to determining that the complexity score is above a predetermined threshold, providing, via the one or more processors, a VR alert to the driver through the VR display warning the driver of the upcoming area. The method may include additional, fewer, or alternate actions, including those discussed elsewhere herein.

In another aspect, a computer system configured to provide virtual reality (VR) alerts to a driver of an autonomous vehicle may be provided. The computer system may include one or more local or remote processors, transceivers, VR headsets or displays, servers, and/or sensors configured to: (1) receive an indication that a driver of a vehicle is accessing a VR feed on a VR display; (2) receive an indication that the vehicle is driving in an autonomous mode; (3) determine a complexity score for traversing an upcoming area which the vehicle is approaching; and/or (4) in response to a determination that the complexity score is above a predetermined threshold, provide a VR alert to the driver through the VR display warning the driver of the upcoming area. The computer system may include additional, less, or alternate functionality, including that discussed elsewhere herein.

In yet another aspect, a computer device for providing virtual reality (VR) alerts to a driver of an autonomous vehicle may be provided. The computer device may include: one or more processors; and one or more memories coupled to the one or more processors. The one or more memories including computer executable instructions stored therein that, when executed by the one or more processors, cause the one or more processors to: (1) receive an indication that a driver of a vehicle is accessing a VR feed on a VR display; (2) receive an indication that the vehicle is driving in an autonomous mode; (3) determine a complexity score for traversing an upcoming area which the vehicle is approaching; and/or (4) in response to a determination that the complexity score is above a predetermined threshold, provide a VR alert to the driver through the VR display warning the driver of the upcoming area. The computer device may include additional, less, or alternate functionality, including that discussed elsewhere herein.

In one aspect, a computer-implemented method for generating a virtual reality (VR) feed for presenting real-time road conditions may be provided. The method may be implemented via one or more local or remote processors, servers, transceivers, sensors, VR headsets or displays, and/or other electric or electronic components. In one instance, the method may include: (1) obtaining, via one or more processors, real-time condition data indicating conditions of a road segment in a geographic area; (2) generating, via the one or more processors, a VR feed of the road segment based upon the real-time condition data, the VR feed including a virtual representation of the road segment to reflect the real-time conditions at the road segment; and/or (3) providing, via the one or more processors, the generated VR feed for presentation to a user within a VR display for the user to preview the road segment. The method may include additional, fewer, or alternate actions, including those discussed elsewhere herein.

In another aspect, a computer system configured to generate a virtual reality (VR) feed for presenting real-time road conditions may be provided. The computer system may include one or more local or remote processors, transceivers, servers, VR headsets or displays, and/or sensors configured to: (1) obtain real-time condition data indicating conditions of a road segment in a geographic area; (2) generate a VR feed of the road segment based upon the real-time condition data, the VR feed including a virtual representation of the road segment to reflect the real-time conditions at the road segment; and/or (3) provide the generated VR feed for presentation to a user within a VR display for the user to preview the road segment. The computer system may include additional, less, or alternate functionality, including that discussed elsewhere herein.

In yet another aspect, a computer device for generating a virtual reality (VR) feed for presenting real-time road conditions may be provided. The computer device including: one or more processors; and one or more memories coupled to the one or more processors. The one or more memories including computer executable instructions stored therein that, when executed by the one or more processors, cause the one or more processors to: (1) obtain real-time condition data indicating conditions of a road segment in a geographic area; (2) generate a VR feed of the road segment based upon the real-time condition data, the VR feed including a virtual representation of the road segment to reflect the real-time conditions at the road segment; and/or (3) provide the generated VR feed for presentation to a user within a VR display for the user to preview the road segment. The computer device may include additional, less, or alternate functionality, including that discussed elsewhere herein.

In one aspect, a computer-implemented method for generating a virtual reality (VR) feed corresponding to an event may be provided. The method may be implemented via one or more local or remote processors, servers, transceivers, sensors, VR headsets or displays, and/or other electric or electronic components. In one instance, the method may include: (1) obtaining, via one or more processors, an indication of an event occurring in a geographic area, wherein the event is at least one of: a vehicle collision, a crime, a weather event, or a natural disaster; (2) generating, via the one or more processors, a VR feed of the geographic area at a time of the event based upon real-time condition data from the geographic area, the VR feed including a virtual representation of the geographic area at the time of the event to reflect the real-time conditions at the geographic area; and/or (3) providing, via the one or more processors, the generated VR feed for presentation to a user within a virtual reality display for the user to experience the geographic area where the event occurred within a VR environment. The method may include additional, fewer, or alternate actions, including those discussed elsewhere herein.

In another aspect, a computer system configured to generate a virtual reality (VR) feed corresponding to an event may be provided. The computer system may comprise one or more local or remote processors, transceivers, servers, VR headsets or displays, and/or sensors configured to: (1) obtain an indication of an event occurring in a geographic area, wherein the event is at least one of: a vehicle collision, a crime, a weather event, or a natural disaster; (2) generate a VR feed of the geographic area at a time of the event based upon real-time condition data from the geographic area, the VR feed including a virtual representation of the geographic area at the time of the event to reflect the real-time conditions at the geographic area; and/or (3) provide the generated VR feed for presentation to a user within a virtual reality display for the user to experience the geographic area where the event occurred within a VR environment. The computer system may include additional, less, or alternate functionality, including that discussed elsewhere herein.

In yet another aspect, a computer device for generating a virtual reality (VR) feed corresponding to an event may be provided. The computer device may include: one or more processors; and one or more memories coupled to the one or more processors. The one or more memories including computer executable instructions stored therein that, when executed by the one or more processors, may cause the one or more processors to: (1) obtain an indication of an event occurring in a geographic area, wherein the event is at least one of: a vehicle collision, a crime, a weather event, or a natural disaster; (2) generate a VR feed of the geographic area at a time of the event based upon real-time condition data from the geographic area, the VR feed including a virtual representation of the geographic area at the time of the event to reflect the real-time conditions at the geographic area; and/or (3) provide the generated VR feed for presentation to a user within a virtual reality display for the user to experience the geographic area where the event occurred within a VR environment. The computer device may include additional, less, or alternate functionality, including that discussed elsewhere herein.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

FIG. 12 illustrates a flow diagram of an exemplary computer-implemented method for presenting real-time road conditions, including determining a route that the vehicle is on.

Figure 1:
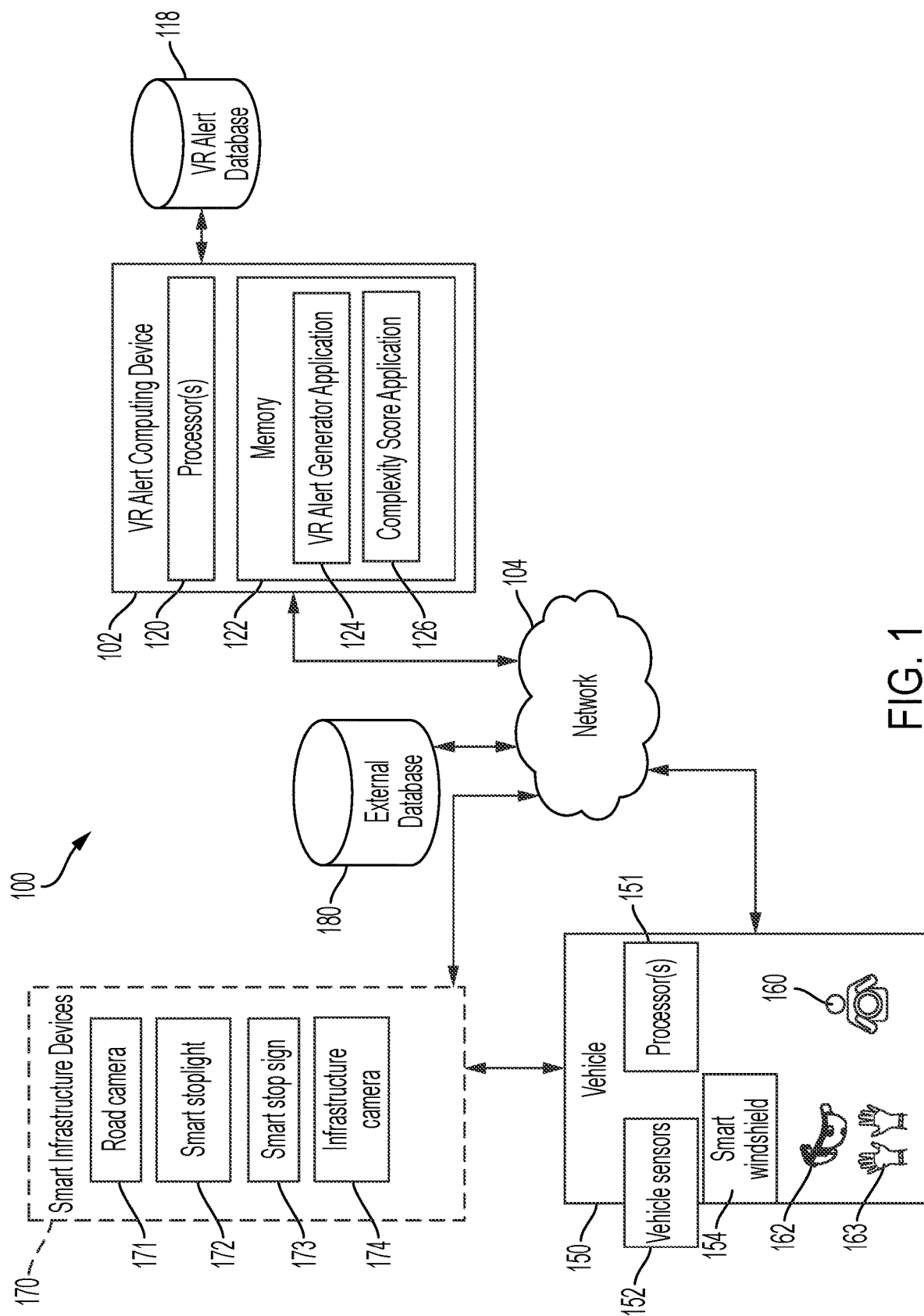
FIG. 1 illustrates an exemplary system for providing VR alerts to a driver of an autonomous vehicle.

While the systems and methods disclosed herein is susceptible of being embodied in many different forms, it is shown in the drawings and will be described herein in detail specific exemplary embodiments thereof, with the understanding that the present disclosure is to be considered as an exemplification of the principles of the systems and methods disclosed herein and is not intended to limit the systems and methods disclosed herein to the specific embodiments illustrated. In this respect, before explaining at least one embodiment consistent with the present systems and methods disclosed herein in detail, it is to be understood that the systems and methods disclosed herein is not limited in its application to the details of construction and to the arrangements of components set forth above and below, illustrated in the drawings, or as described in the examples. Methods and apparatuses consistent with the systems and methods disclosed herein are capable of other embodiments and of being practiced and carried out in various ways. Also, it is to be understood that the phraseology and terminology employed herein, as well as the abstract included below, are for the purposes of description and should not be regarded as limiting.

DETAILED DESCRIPTION

In general, the present embodiments relate to, inter alia: (i) providing VR alerts to a driver of an autonomous vehicle; (ii) generating a VR feed for presenting real-time road conditions; and/or (iii) generating a VR feed corresponding to an event.

More specifically, first, the present embodiments may relate to, inter alia, generating Virtual Reality (VR) alerts for challenging streets. For instance, a VR environment may be provided in which VR alerts are generated for challenging streets or areas for delivery drivers/passengers, truck drivers/passengers, or other vehicles. The environment provides audible or visual alerts for the driver to pay attention in certain areas. As an example, an alert may interrupt a viewing of movie or playing of a video game using a VR headset, to alert the passenger that the Autonomous Vehicle (AV) is approaching construction, congestion, an accident, or tight city streets and the passenger should take manual control of the AV. The VR environment may also provide for VR driver training for the challenging streets/areas. For instance, virtual street/driving training of scenes of tight city streets may be provided via a VR headset prior to the driver traveling to that area of the city.

Second, the present embodiments may relate to, inter alia, a VR environment for presenting real-time road conditions, such as on an AR (Augmented Reality)/VR headset or AR/VR display. The VR environment may live-stream what current weather/road or traffic conditions look like from the perspective of other drivers (e.g., gather feeds from smart glasses, AR or VR glasses/headsets, smart vehicle cameras, and post the images on the internet or for viewing on a VR headset). A user may go into the Metaverse or other virtual environment, and preview roads for driving along predetermined routes and/or in certain difficult areas based on sensor data and/or images from vehicles in that area. For instance, if the user is going to travel from Denver to Cheyenne in winter and snow is forecasted, or driving into Chicago, allow the user to view current road and traffic conditions. In certain embodiments, a VR headset or smart windshield may also be able to display road conditions from vehicles directly ahead of the user, e.g., collect and display images from vehicles or passengers traveling a few miles ahead and along the same route of the user.

Third, the present embodiments may relate to, inter alia, a VR environment for accident reconstruction. A VR environment may be provided for representing a real-time view of a certain geographical area where users can go in and experience what is happening in the area. This may include real-time viewing of an accident scene, crime scene, or other real-time event. The scene may include real-time weather conditions or natural disaster conditions (e.g., forest fires, hurricanes) which may be provided from sensors or cameras within the area (e.g., vehicle sensors, infrastructure sensors, drones, etc.). For privacy reasons, the VR environment may blur out individuals (e.g., mask faces) within the scene, license plates, or other identifying information, or replace with the individuals with generic avatars. The VR environment may also provide a more photorealistic stream of individuals to emergency services to show the extent of injuries from the event.

Exemplary System for Providing VR Alerts to a Driver of an Autonomous Vehicle

Some embodiments disclosed herein advantageously provide VR alerts to a driver of an autonomous vehicle. For example, a vehicle may be driving autonomously while the human driver uses VR goggles to play a VR video game or watch a VR movie. In this example, if the vehicle approaches an area that it will be difficult for the vehicle to traverse autonomously (e.g., because area is a construction area, or because of a weather condition, etc.), it may be advantageous (e.g., to reduce the likelihood of an accident) for the human to take control of the vehicle while driving through the area.

To this end, FIG. 1 shows an example system 100 for providing VR alerts to a driver of an autonomous vehicle. The high-level architecture includes both hardware and software applications, as well as various data communications channels for communicating data between the various hardware and software components.

With reference thereto, vehicle 150 may be an autonomous vehicle (e.g., a vehicle capable of driving autonomously, semi-autonomously, or in a manual mode, etc.). In this regard, the vehicle 150 may have autonomous operation features that may take full control of the vehicle under certain conditions, viz. fully autonomous operation, or the autonomous operation features may assist the vehicle operator in operating the vehicle, viz. partially autonomous operation. Fully autonomous operation features may include systems within the vehicle that pilot the vehicle to a destination with or without a vehicle operator present (e.g., an operating system for a driverless car). Partially autonomous operation features may assist the vehicle operator in limited ways (e.g., automatic braking or collision avoidance systems). Fully or partially autonomous operation features may perform specific functions to control or assist in controlling some aspect of vehicle operation, or such features may manage or control other autonomous operation features. For example, a vehicle operating system may control numerous subsystems that each fully or partially control aspects of vehicle operation.

In addition to information regarding the position or movement of a vehicle, autonomous operation features may collect and utilize other information, such as data about other vehicles or control decisions of the vehicle. Such additional information may be used to improve vehicle operation, route the vehicle to a destination, warn of component malfunctions, advise others of potential hazards, or for other purposes described herein. Information may be collected, assessed, and/or shared via applications installed and executing on computing devices associated with various vehicles or vehicle operators, such as on-board computers of vehicles or smartphones of vehicle operators. By using computer applications to obtain data, the additional information generated by autonomous vehicles or features may be used to assess the autonomous features themselves while in operation or to provide pertinent information to non-autonomous vehicles through an electronic communication network 104 (which may be a wired and/or wireless network, such as the internet). These and other advantages are further described below.

Some autonomous operation features may be adapted for use under particular conditions, such as city driving or highway driving. Additionally, the vehicle operator may be able to configure settings relating to the features or may enable or disable the features at will. Therefore, some embodiments monitor use of the autonomous operation features, which may include the settings or levels of feature use during vehicle operation. Information obtained by monitoring feature usage may be used to determine risk levels associated with vehicle operation, either generally or in relation to a vehicle operator. In such situations, total risk may be determined by a weighted combination of the risk levels associated with operation while autonomous operation features are enabled (with relevant settings) and the risk levels associated with operation while autonomous operation features are disabled. For fully autonomous vehicles, settings or configurations relating to vehicle operation may be monitored and used in determining vehicle operating risk.

In some embodiments, information regarding the risks associated with vehicle operation with and without the autonomous operation features may be used to determine risk categories or premiums for a vehicle insurance policy covering a vehicle with autonomous operation features, as described elsewhere herein. Risk category or price may be determined based upon factors relating to the evaluated effectiveness of the autonomous vehicle features. The risk or price determination may also include traditional factors, such as location, vehicle type, and level of vehicle use.

The vehicle 150 may have various vehicle sensors 152. The vehicle sensors 152 may be any kind of sensors. Examples of the vehicle sensors 152 include: cameras (e.g., for capturing images and/or video), light detection and ranging (LIDAR) cameras, radio detection and ranging (RADAR) devices, accelerometers, gyroscopes, compasses, speedometers, magnetometers, barometers, thermometers, proximity sensors, light sensors (e.g., light intensity detectors), electromagnetic radiation sensors (e.g., infrared and/or ultraviolet radiation sensors), ultrasonic and/or infrared range detectors, humistors, hygrometers, altimeters, microphones, audio or video recorders, etc. Additional examples vehicle sensors 152 include advanced sensors, for example, that detect and/or receive data associated with temperature measurements, thermal imaging, weather conditions, traffic conditions, etc. The vehicle 150 may include any number or combination of vehicle sensors 152.

The vehicle 150 may further include one or more processors 151 such as one or more microprocessors, controllers, and/or any other suitable type of processor. The one or more processors 151 may perform any functions. For example, the one or more processors 151 may control the vehicle 151 while it is driving in an autonomous or semi-autonomous mode. In another example, the one or more processors 151 may switch the vehicle 150 between manual, autonomous, and semi-autonomous modes. As will be discussed further below, the one or more processors 151 may perform any of the functions of the VR alert generator application 124 and/or the complexity score application 126.

The vehicle 150 may further include a smart windshield 154. The smart windshield 154 may be configured to produce a VR or augmented reality (AR) display, respectively, from a VR feed or AR feed.

The vehicle 150 may be driven by driver 160. For example, the driver 160 may operate the vehicle 150 when the vehicle 150 is in a manual mode or a semi-autonomous mode. When the vehicle is in an autonomous mode, the driver may simply sit in the vehicle without operating the vehicle.

While in the vehicle 150, the driver 160 may view a VR display (e.g., the smart windshield 154 or VR goggles 162). The VR display may be viewed, for instance, by accessing a VR feed. In some examples, the VR feed comprises a VR movie or a VR video game.

As mentioned above, while the driver 160 is watching a VR movie or playing a VR videogame and the vehicle 150 is driving autonomously, it may happen that the vehicle 150 approaches an upcoming area that it would be difficult for the vehicle 150 to drive autonomously through. As such, it would be advantageous for the driver 160 to stop interacting with the VR display, and take manual control of the vehicle through the upcoming area. To this end, the example system 100 includes VR alert computing device 102 for generating and sending VR alerts to the vehicle 150.

The VR alert computing device 102 may further include one or more processors 120 such as one or more microprocessors, controllers, and/or any other suitable type of processor. The VR alert computing device 102 may further include a memory 122 (e.g., volatile memory, non-volatile memory) accessible by the one or more processors 120, (e.g., via a memory controller).

The one or more processors 120 may interact with the memory 122 to obtain, for example, computer-readable instructions stored in the memory 122. Additionally or alternatively, computer-readable instructions may be stored on one or more removable media (e.g., a compact disc, a digital versatile disc, removable flash memory, etc.) that may be coupled to the VR alert computing device 102 to provide access to the computer-readable instructions stored thereon. In particular, the computer-readable instructions stored on the memory 122 may include instructions for executing various applications, such as a VR alert generator application 124, and/or a complexity score application 126.

Figure 2:
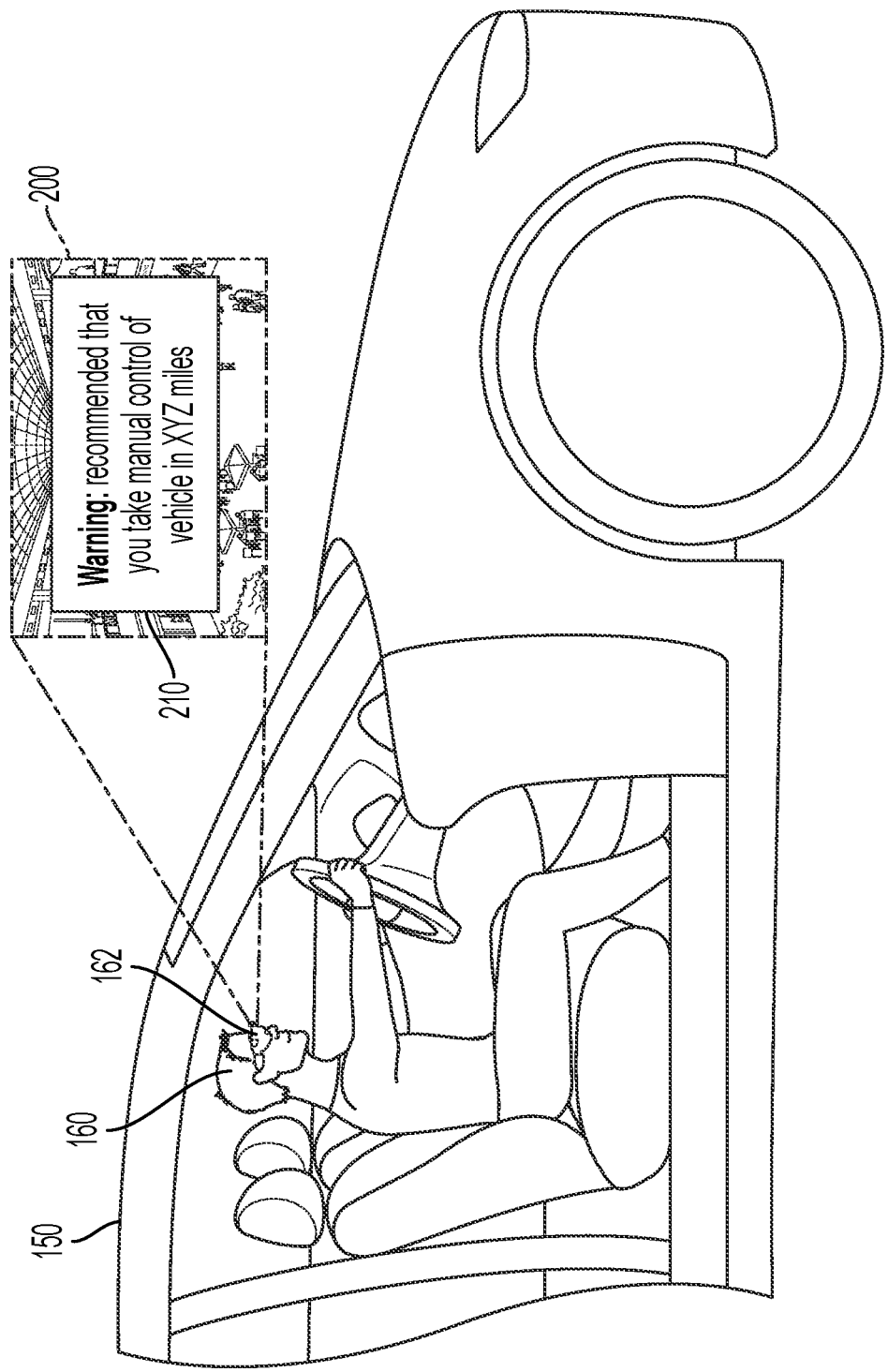
FIG. 2 illustrates an exemplary VR display including an example VR alert overlaid onto a VR feed.

In some examples, the VR alert generator application 124 may generate VR alerts, such as the VR alert 210 on the example display 200 of FIG. 2. In the example of FIG. 2, the vehicle 150 is driving autonomously while the driver 160 is watching a VR movie via the VR goggles 162. In this example, the VR alert generator application 124 generates a VR alert 210 which is overlaid on to the VR movie (e.g., overlaid onto the VR feed comprising the VR movie). The generated VR alert, in this example, comprises the text, "Warning: recommended that you take manual control of vehicle in XYZ miles."

Figure 3:
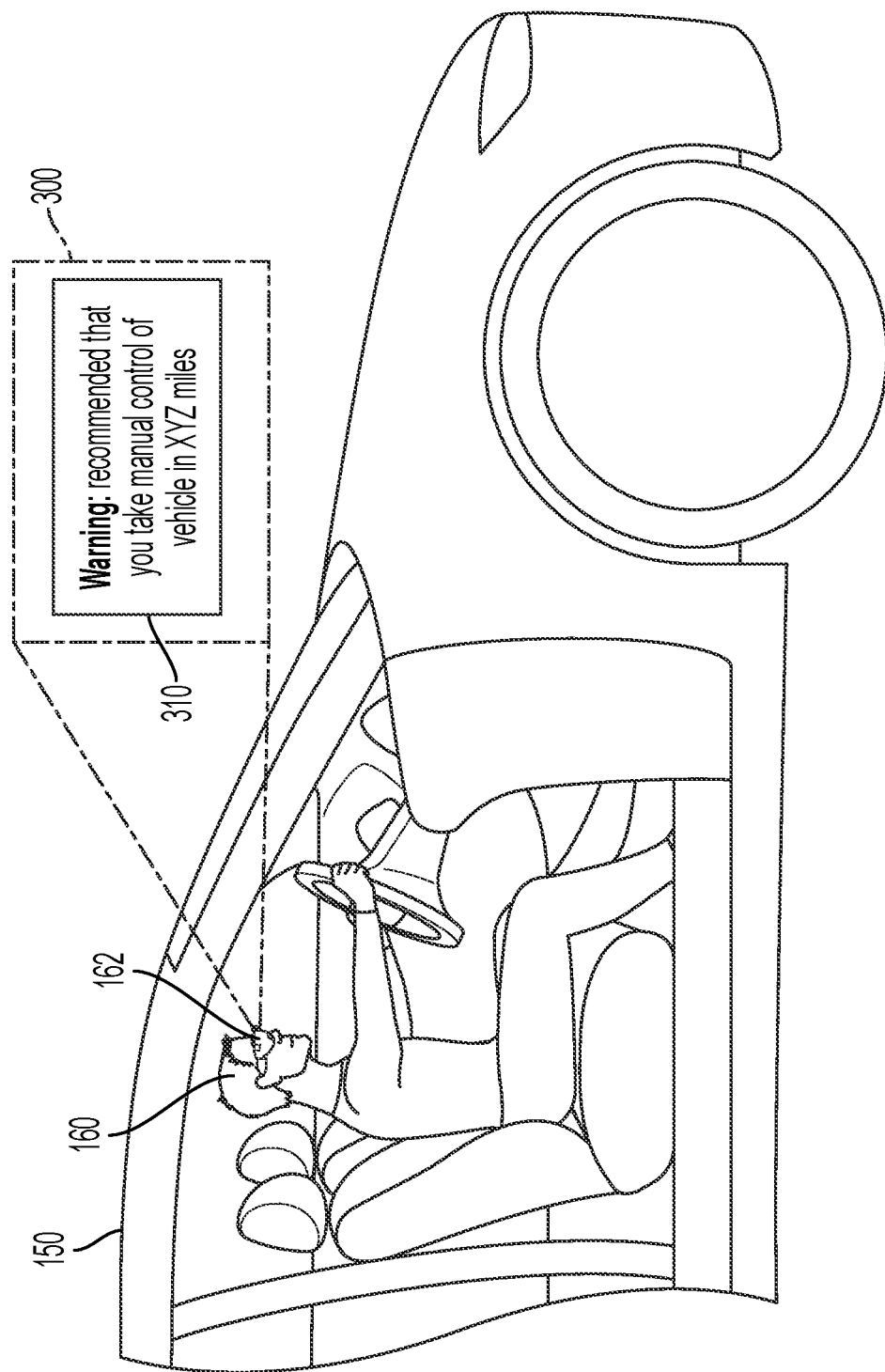
FIG. 3 illustrates an exemplary display where a VR feed to the VR display is stopped, and only a VR alert is displayed on the VR display.

FIG. 3 illustrates another example of an VR alert 310 that may be generated by the VR alert generator application 124. In the example of FIG. 3, to display the VR alert 310, the VR feed (e.g., of an AR movie, or AR videogame) is stopped, and replaced with the VR alert 310 in the example display 300. The generated VR alert, in this example, comprises the text, "Warning: recommended that you take manual control of vehicle in XYZ miles."

Figure 4:
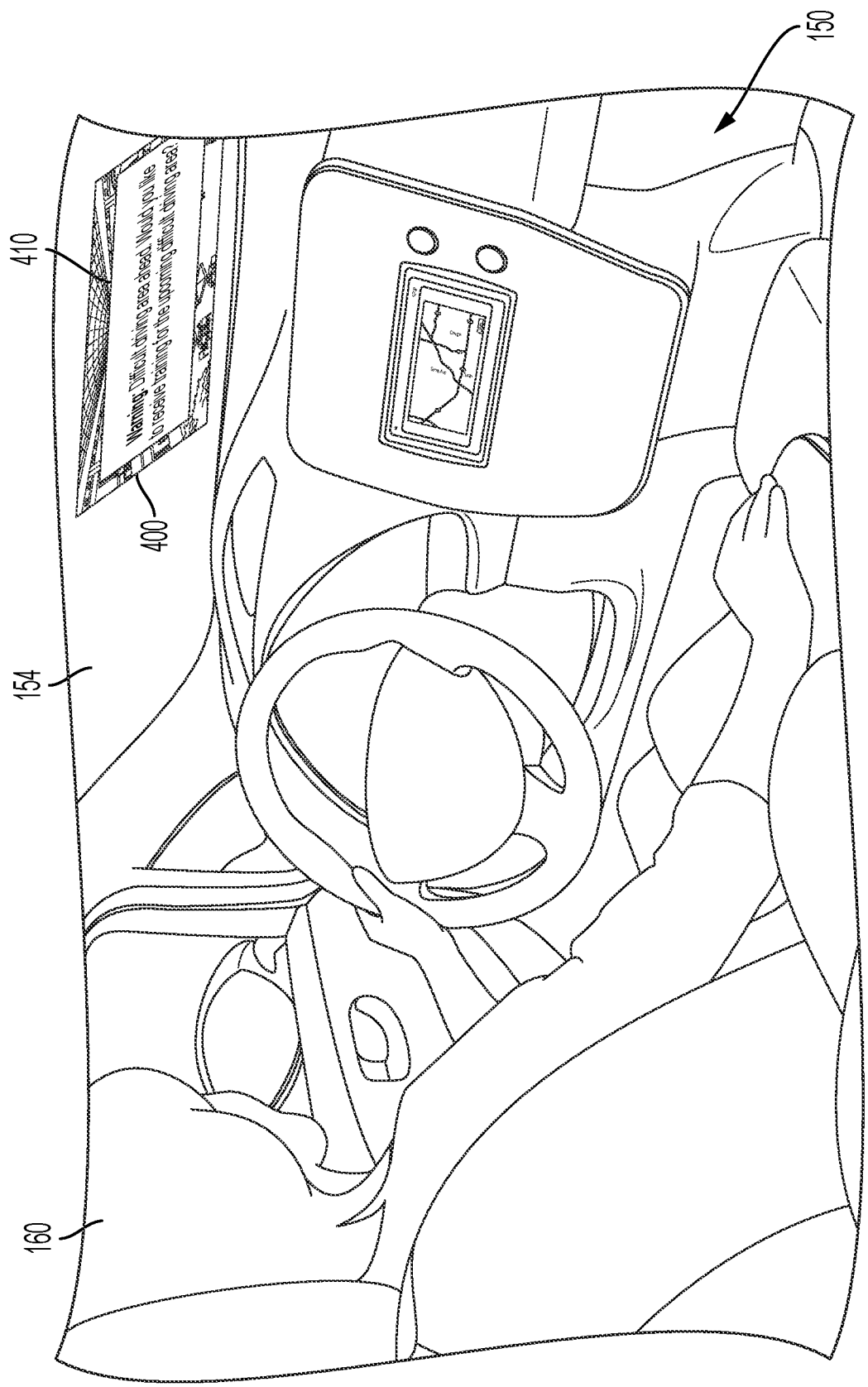
FIG. 4 illustrates an exemplary display including an example VR alert overlaid onto a VR feed, including a request to the driver to receive training for traversing an upcoming area.

FIG. 4 illustrates another example of an VR alert 410 that may be generated by the VR alert generator application 124. In particular, the example display 400 includes a request to the driver 160 to receive training for traversing the upcoming area. Specifically, the alert 410 states, "Warning: Difficult driving area ahead. Would you like to receive training for the upcoming difficult driving area?" In this regard, as will be discussed elsewhere herein, providing training to a driver about specific areas can be particularly useful in certain situations. For example, when an area is difficult because of narrow streets or sharp turns, providing training to the driver tailored specifically to the upcoming narrow streets or sharp turns can be particularly useful. In the example of FIG. 4, the driver 160 is viewing the example display 400 on the smart windshield 154.

In some embodiments, the VR alert generator application 124 determines to generate a VR alert based upon a complexity score for traversing an upcoming area, which may be generated by the complexity score application 126. For example, if an upcoming area would be difficult for the vehicle to traverse autonomously, the complexity score application 126 may generate a higher complexity score for the upcoming area.

In some embodiments, the complexity score may be determined based upon at least one of: construction, congestion, road curvature, a traffic accident, a weather condition, and/or narrow streets in the upcoming area. The data that the complexity score is determined from may come from any source. For example, the data may come from a database, such as VR alert data base 118 (e.g., a proprietary database of a company of the VR alert computing device 102), and/or the external database 180 (e.g., a third party data bases, such as that of a third party aggregator, a road infrastructure data base, a weather database, etc.).

Additionally or alternatively, the data may come from smart infrastructure devices 170. Examples of the smart infrastructure devices include road camera 171, smart stoplight 172, smart stop sign 173, and infrastructure camera 174. Any of the smart infrastructure devices 170 may include any kind of sensors. For example, any of the smart infrastructure devices 170 may include: cameras (e.g., for capturing images and/or video), light detection and ranging (LIDAR) cameras, radio detection and ranging (RADAR) devices, accelerometers, gyroscopes, compasses, speedometers, magnetometers, barometers, thermometers, proximity sensors, light sensors (e.g., light intensity detectors), electromagnetic radiation sensors (e.g., infrared and/or ultraviolet radiation sensors), ultrasonic and/or infrared range detectors, humistors, hygrometers, altimeters, microphones, audio or video recorders, thermal imaging devices, etc. Furthermore, any of the smart infrastructure devices 170 may include multiple sensors (e.g., any combination of the example sensors just listed).

Exemplary Methods for Providing VR Alerts to a Driver of an Autonomous Vehicle

Figure 5:
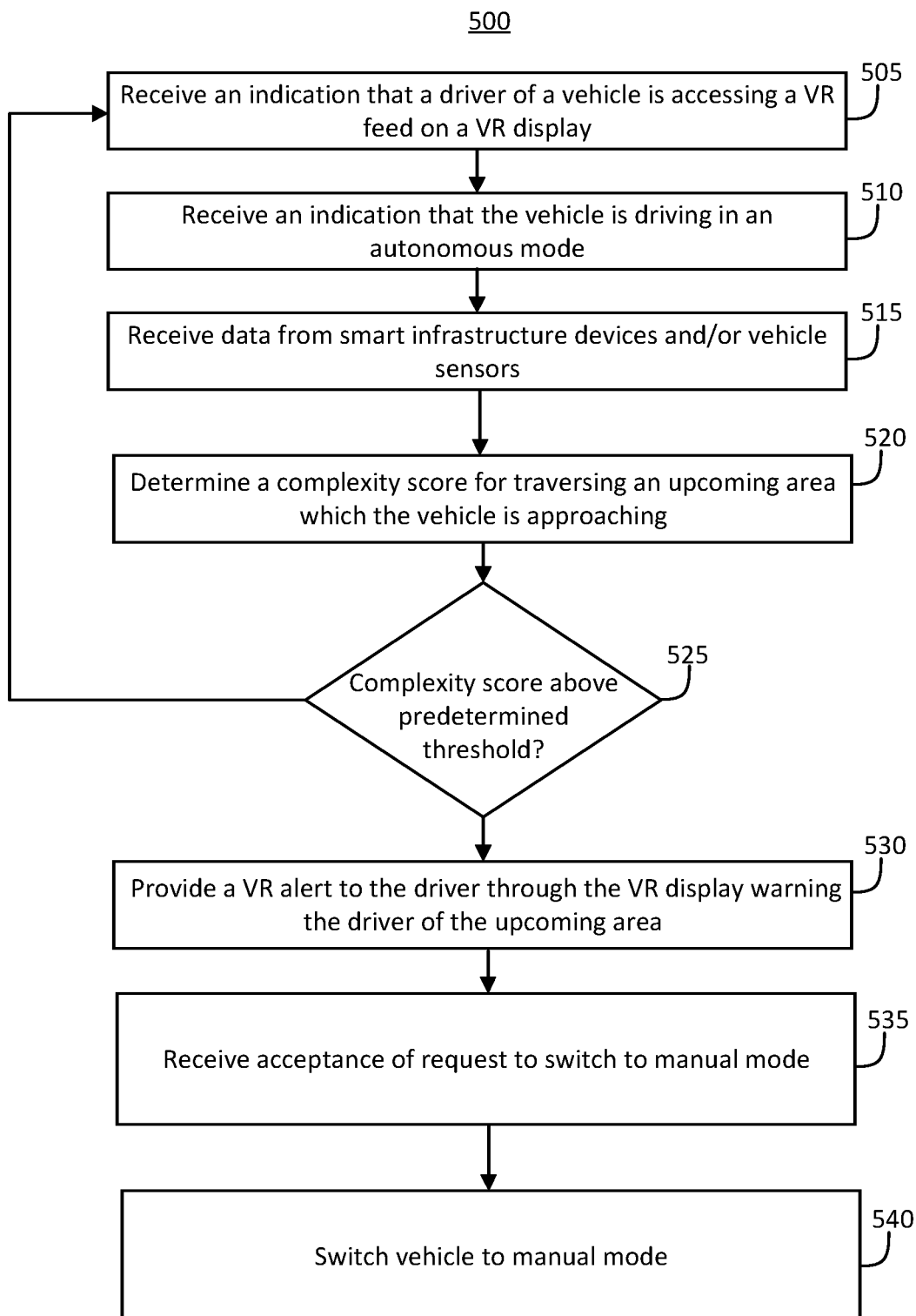
FIG. 5 illustrates a flow diagram of an exemplary computer-implemented method for providing VR alerts to a driver of an autonomous vehicle.

FIG. 5 shows an exemplary implementation 500 for providing VR alerts to a driver of an autonomous vehicle. Although the following discussion refers to many of the blocks of the example implementation 500 as being performed by the one or more processors 120, it should be understood that any of the blocks or functions of the example implantation 500 may be performed by either of the one or more processors 120 of the VR alert computing device 102, or the one or more processors 151 of the vehicle 150.

The exemplary implementation 500 begins at block 505 when the one or more processors 120 receive an indication that the driver 160 of the vehicle 150 is accessing a VR feed on a VR display (e.g., the VR googles 162 or the smart windshield 154). In some examples, the VR feed comprises a VR movie or a VR videogame.

At block 510, the one or more processors 120 receive an indication that the vehicle is driving in an autonomous mode. Along with the indication that the vehicle is driving in an autonomous mode, the one or more processors 120 may also receive an indication of a route that the vehicle is traveling on. For example, the driver 160 may have input a route or destination into a GPS device of the vehicle 150, or a smartphone device; and this route or destination may be sent to the one or more processors 120 along with the indication of a route that the vehicle is traveling on. However, the route or destination of the vehicle 150 may also be sent to the one or more processors 120 separately from the indication that the vehicle is driving in an autonomous mode.

At block 515, the one or more processors 120 receive data from the smart infrastructure devices 170 and/or the vehicle sensors 152.

At block 520, the one or more processors 120 determine a complexity score for traversing an upcoming area which the vehicle is approaching. In some embodiments, this first involves determining upcoming areas that the vehicle is approaching. This determination may be made based upon the route or destination received by the one or more processors 120 from the vehicle 150. Additionally or alternatively, the upcoming areas may be determined based upon a prediction of a route that the vehicle 150 will take. For example, the one or more processors 120 may predict a route (and possibly a destination) based upon any criteria, such as a known location of the vehicle 150, a driving history of the vehicle 150, known previous destinations of the vehicle 150, etc.

The complexity score may be determined based upon any data, and determined in any suitable manner. In some examples, the complexity score is determined based upon the data received from the smart infrastructure devices 170 and/or the vehicle sensors 152 at block 515. In one example of this, the one or more processors use image and/or video data (e.g., received from any of the road camera 171, the smart stoplight 172, the smart stop sign 173, and/or the infrastructure camera 174) to determine construction, congestion, road curvature, a traffic accident, a weather condition, or narrow streets in the upcoming area.

Additionally or alternatively, the complexity score may be determined based upon data received from VR alert database 118 and/or external database 180. For example, the VR alert database 118 and/or external database 180 may send construction data, congestion data, road curvature data, data of a traffic accident, weather condition data, or data of narrow streets to the one or more processors 120; and the one or more processors 120 may use any of this data to determine the complexity score.

In some embodiments, advantageously, the complexity score is determined only from data from the smart infrastructure devices 170, and not from data from the vehicle sensors 152. For example, if the upcoming area is more than a predetermined distance ahead of the vehicle 150, then the one or more processors 120 may not use data from the vehicle sensors 152. Advantageously, this may increase accuracy of the complexity score, and decrease the amount of time it takes the one or more processors 120 to determine the complexity score.

In some embodiments, the complexity score is determined via a machine learning algorithm. The machine learning algorithm may take any of the data discussed above as inputs. Furthermore, the machine learning algorithm may have been trained by any suitable technique (e.g., supervised learning, unsupervised learning, semi-supervised learning). Examples of the machine learning algorithm may include neural networks, deep learning algorithms, etc.

At block 525, the one or more processors 120 determine if the complexity score is above a predetermined threshold. If not, the processes returns to block 505. However, it should be understood that implementation 500 is only an example; and, in other examples, the process may return to any of blocks 510, 515, or 520, rather than return to block 505.

If the complexity score is above a predetermined threshold, a VR alert is provided to the VR display warning the driver 160 of the upcoming area (block 530). Examples of providing the alert include overlaying the VR alert onto a VR feed (e.g., FIG. 2), and stopping the VR feed while displaying the VR alert on the VR display (e.g., FIG. 3).

The VR alert may also include an indication that the driver should take control of the vehicle. In this regard, there may be different levels of the VR alert. In one example, the different levels of the VR alert correspond to the different ranges of the complexity score (e.g., high complexity score indicating a high level of VR alert). In this regard, the text of the VR alert may change depending on the different levels of the VR alert (e.g., a high VR alert has text of "strongly recommended that you switch to manual control," whereas a low VR alert has text of "consider switching to manual control"). The different VR alert levels may also be color coded in the VR alert (e.g., high VR alert indicated with red text; low VR alert indicated with green text; etc.).

The alert may also indicate a distance to the upcoming area (e.g., text indicating "recommended that you take manual control of vehicle in XYZ miles"). The alert may also be color coded based on the distance to the upcoming area (e.g., red text indicating a shorter distance to the upcoming area; green indicating a longer distance to the upcoming area; etc.).

Additionally or alternatively, in some embodiments, the alert may be haptic. In one example, the driver 160 is provided the haptic VR alert through the VR goggles 162 (e.g., a tapping, vibrating, or rubbing provided by the VR goggles 162). In another example, there may be a pair of VR gloves 163 with the VR goggles 162 (e.g., VR gloves 163 that are used to control the VR goggles or headset 162), and the haptic VR alert is provided through the VR gloves 163 (e.g., VR gloves 163 vibrating, etc.).

Additionally or alternatively, in some embodiments, the alert may be audible. In some examples, the text of any of the VR alerts (e.g., the text of any of VR alerts 210, 310, 410) is read aloud through speakers of the vehicle 150, or VR goggles 162.

Additionally or alternatively to the VR alert, an augmented reality (AR) alert may be provided. For example, if the driver 160 is watching a VR video on the smart windshield 154, the VR video feed may be stopped, and an AR alert may be provided. For instance, the AR alert may indicate, "vehicle is approaching complex area ahead. Would you like to switch to manual control?" Advantageously, displaying the alert in AR form shows the driver 160 an additional view through the smart windshield 154, thus allowing the driver 160 to know specifically where he is (if he is familiar with the route the vehicle is driving along).

Moreover, in such embodiments, the driver 160 may control the position or other aspects of the AR alert or any other AR information. For example, the driver 160 may use the VR/AR gloves 163 to control the position of the AR alert on the smart windshield 154. In another example, the driver 160 may use the VR/AR gloves 163 to remove the AR alert from the smart windshield 154 (e.g., with a swiping motion).

The VR (or AR) alert may also include a request for the driver 160 to switch the vehicle 150 to a manual mode (e.g., VR alert has text "would you like to switch to manual mode"). At block 535, the one or more processors 120 receive acceptance of the request to switch the vehicle to manual mode. At block 540, the one or more processors 120 switch the vehicle to manual mode (e.g., provide a command to the one or more processors 151 to switch the vehicle 150 to manual mode).

However, as noted above, any of the blocks may be performed by the one or more processors 151. Thus, in some embodiments, the acceptance of the request (e.g., block 535) is sent to the one or more processors 151 (rather than the one or more processors 120), accordingly advantageously saving bandwidth and computational resources by eliminating unnecessary signals to the VR alert computing device 102.

Figure 6:
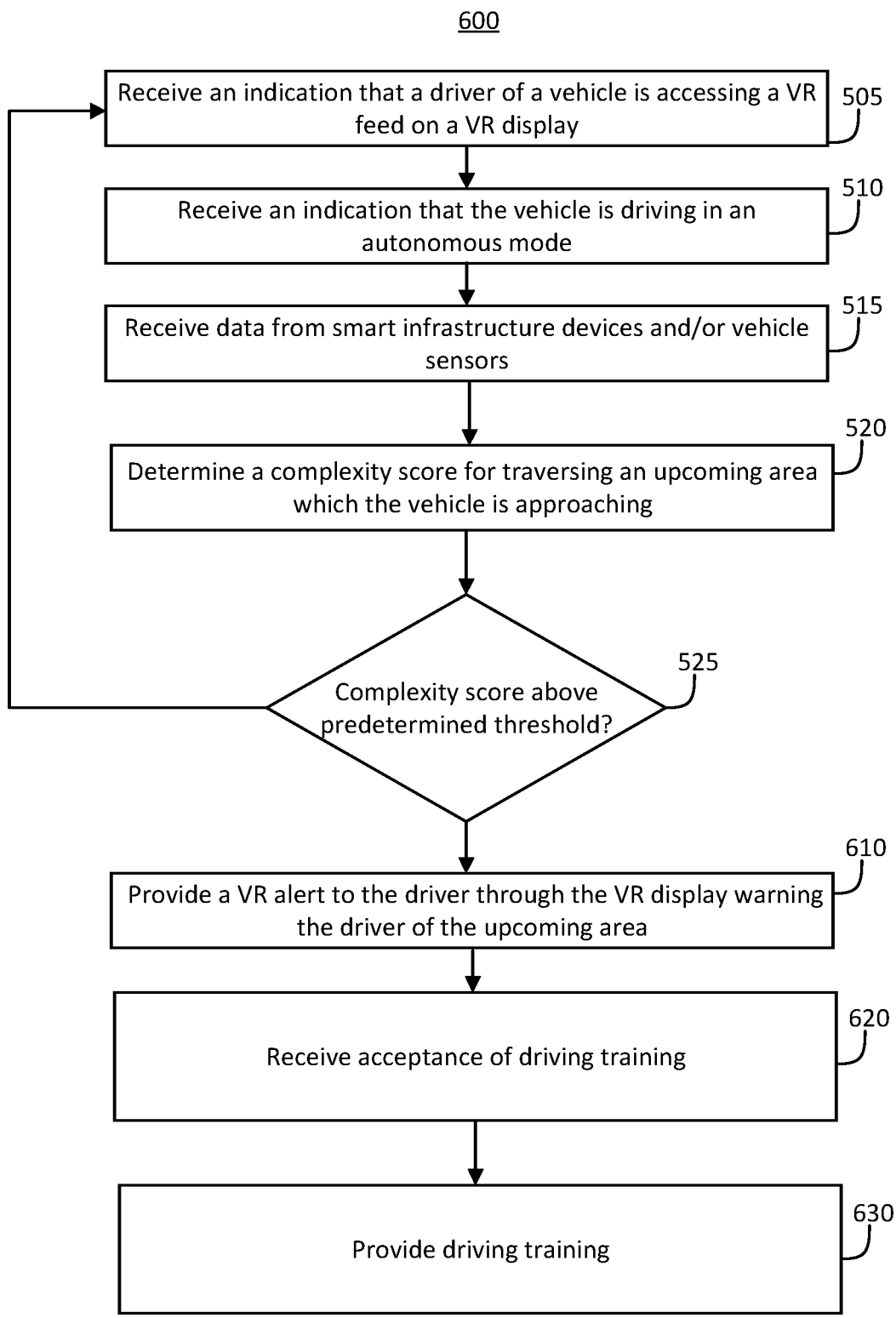
FIG. 6 illustrates a flow diagram of an exemplary computer-implemented method for providing VR alerts to a driver of an autonomous vehicle, including providing a driver with training for traversing an upcoming area.

FIG. 6 illustrates an exemplary implementation 600 of providing VR alerts to a driver of an autonomous vehicle, including providing a driver with training for traversing an upcoming area. Although the following discussion refers to many of the blocks of the example implementation 600 as being performed by the one or more processors 120, it should be understood that any of the blocks or functions of the example implantation 600 may be performed by either of the one or more processors 120 of the VR alert computing device 102, or the one or more processors 151 of the vehicle 150.

In the example implementation 600, blocks 505-525 may be performed as in FIG. 5. At block 610, the one or more processors 120 may, additionally or alternatively to the providing a VR alert as in block 530 of FIG. 5, provide the VR alert with a request to the driver to receive training for traversing the upcoming area. The training may relate to any condition in the upcoming area (e.g., construction, congestion, road curvature, a traffic accident, a weather condition, or narrow streets in the upcoming area). In this regard, the VR alert may also indicate the condition (e.g., VR alert indicating "There will be a storm in approximately XYZ miles. Would you like training on driving through a storm?").

At block 620, the one or more processors 120 receive acceptance of the driving training.

At block 630, the one or more processors 120 provide the driving training. In one example, the driver 160 is wearing a pair of VR goggles 162 with a pair of VR gloves 163 that control the VR goggles 162. The driver 160 may complete the training using the VR goggles 162 and VR gloves 163.

In another example, the training is displayed on the smart windshield 154, and the driver 160 completes the training using the vehicle controls (e.g., the vehicle's steering wheel, accelerator pedal, etc.). In some implementations of this, the vehicle is still driving autonomously while the driver 160 completes the training (e.g., the driver 160 turning the steering wheel as part of the training does not affect the vehicle's actual steering because the vehicle 150 is driving autonomously).

It should be understood that not all blocks of the exemplary flowcharts 500, 600 are required to be performed. Moreover, the example flowcharts 500, 600 are not mutually exclusive (e.g., block(s) from each example flowchart 500, 600 may be performed in any other flowchart). The exemplary flowcharts 500, 600 may include additional, less, or alternate actions, including those discussed elsewhere herein.

Applicability to the Insurance Industry

Some embodiments have particular applicability to the insurance industry. For example, discounts to insurance premiums may be provided by the techniques described herein. For instance, if a driver 160 competes training (e.g., as provided in FIG. 6), the driver 160 may receive a discount on an insurance premium.

In another example, a driver 160 may receive a discount on an insurance premium for agreeing to have VR alerts provided to her or her vehicle 150.

In one aspect, data from the vehicle 150, and/or other data, including the types of data discussed elsewhere herein, may be collected or received by an insurance provider remote server, such as via direct or indirect wireless communication or data transmission from a smart home controller, mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to autonomous vehicles.

Exemplary Use of Providing VR Alerts to a Driver of an Autonomous Vehicle

In one aspect, a computer-implemented method for providing virtual reality (VR) alerts to a driver of an autonomous vehicle may be provided. The method may include: (1) receiving, via one or more processors, an indication that a driver of a vehicle is accessing a VR feed on a VR display; (2) receiving, via the one or more processors, an indication that the vehicle is driving in an autonomous mode; (3) determining, via the one or more processors, a complexity score for traversing an upcoming area which the vehicle is approaching; and/or (4) in response to determining that the complexity score is above a predetermined threshold, providing, via the one or more processors, a VR alert to the driver through the VR display warning the driver of the upcoming area. The method may include additional, fewer, or alternate actions, including those discussed elsewhere herein.

For instance, the VR feed may include a VR movie or a VR video game; and/or providing the VR alert may include, via the one or more processors: (i) stopping the VR feed, and/or (ii) displaying the VR alert on the VR display. In some embodiments, providing the VR alert may include, via the one or more processors, overlaying the VR alert onto the VR feed. Additionally or alternatively, the VR alert may include an indication that the driver should take control of the vehicle.

In certain embodiments, the VR alert may include a request to the driver to switch the vehicle to a manual mode; and/or the method may further include: in response to the driver accepting the request to switch to the manual mode, switching, via the one or more processors, control of the vehicle from the autonomous mode to the manual mode.

In some embodiments, the complexity score for traversing the upcoming area may be determined based upon at least one of: construction, congestion, traffic density, road conditions, road curvature, a traffic accident, a weather condition, or narrow streets in the upcoming area. In other embodiments, the complexity score for traversing the upcoming area may not be determined based upon data generated from sensors in the vehicle.

In certain embodiments, providing the VR alert may include presenting, via the one or more processors, a request to the driver to receive training for traversing the upcoming area; and/or the method may further include: in response to the driver accepting the request to receive the training, providing, via the one or more processors, the training for traversing the upcoming area on the VR display.

In some embodiments, the complexity score for traversing the upcoming area may be based upon narrow streets in the upcoming area, the narrow streets including a particular narrow street; providing the VR alert may include presenting, via the one or more processors, a request to the driver to receive training for traversing the particular narrow street; and/or the method may further include: in response to the driver accepting the request to receive the training, providing, via the one or more processors, the training for the particular narrow street on the VR display.

In another aspect, a computer system configured to provide virtual reality (VR) alerts to a driver of an autonomous vehicle may be provided. The computer system may include one or more local or remote processors, transceivers, and/or sensors configured to: (1) receive an indication that a driver of a vehicle is accessing a VR feed on a VR display; (2) receive an indication that the vehicle is driving in an autonomous mode; (3) determine a complexity score for traversing an upcoming area which the vehicle is approaching; and/or (4) in response to a determination that the complexity score is above a predetermined threshold, provide a VR alert to the driver through the VR display warning the driver of the upcoming area. The computer system may include additional, less, or alternate functionality, including that discussed elsewhere herein.

For instance, the VR feed may include a VR movie or a VR video game; and/or providing the VR alert may include: (i) stopping the VR feed, and/or (ii) displaying the VR alert on the VR display. In some embodiments, providing the VR alert may include overlaying the VR alert onto the VR feed. Additionally or alternatively, the VR alert may include an indication that the driver should take control of the vehicle.

In some embodiments, the VR alert may include a request to the driver to switch the vehicle to a manual mode; and the one or more local or remote processors, transceivers, and/or sensors may be further configured to: in response to the driver accepting the request to switch to the manual mode, switch control of the vehicle from the autonomous mode to the manual mode.

In some embodiments, the complexity score for traversing the upcoming area may be determined based upon at least one of: construction, congestion, traffic density, road conditions, road curvature, a traffic accident, a weather condition, or narrow streets in the upcoming area.

In yet another aspect, a computer device for providing virtual reality (VR) alerts to a driver of an autonomous vehicle may be provided. The computer device may include: one or more processors; and one or more memories coupled to the one or more processors. The one or more memories including computer executable instructions stored therein that, when executed by the one or more processors, cause the one or more processors to: (1) receive an indication that a driver of a vehicle is accessing a VR feed on a VR display; (2) receive an indication that the vehicle is driving in an autonomous mode; (3) determine a complexity score for traversing an upcoming area which the vehicle is approaching; and/or (4) in response to a determination that the complexity score is above a predetermined threshold, provide a VR alert to the driver through the VR display warning the driver of the upcoming area. The computer device may include additional, less, or alternate functionality, including that discussed elsewhere herein.

For instance, the VR feed may include a VR movie or a VR video game; and/or providing the VR alert may include: (i) stopping the VR feed, and/or (ii) displaying the VR alert on the VR display. In some embodiments, providing the VR alert may include overlaying the VR alert onto the VR feed. Additionally or alternatively, the VR alert may include an indication that the driver should take control of the vehicle.

In some embodiments, the VR alert may include a request to the driver to switch the vehicle to a manual mode; and/or the one or more memories including computer executable instructions stored therein that, when executed by the one or more processors, may further cause the one or more processors to: in response to the driver accepting the request to switch to the manual mode, switch control of the vehicle from the autonomous mode to the manual mode.

Exemplary System for Generating a VR Feed for Presenting Real-Time Road Conditions Some embodiments disclosed herein advantageously generate a VR feed for presenting real-time road conditions. To illustrate, in one example, a user may be in an autonomous vehicle driving to a destination. Here, it is advantageous for the user to know the road conditions on upcoming portions of the route to a destination. For instance, if there is traffic on the route, the user may wish to reroute the vehicle in order to avoid the traffic. Furthermore, in a second example, a user may be at home about to leave for a trip in a vehicle. Prior to departure, the user may wish to check the road conditions of the route she will take on the trip.

To this end, some embodiments disclosed herein advantageously generate a VR feed of a road segment based upon real-time condition data, and provide the generated VR feed for presentation to a user within a VR display for the user to preview the road segment.

Figure 7:
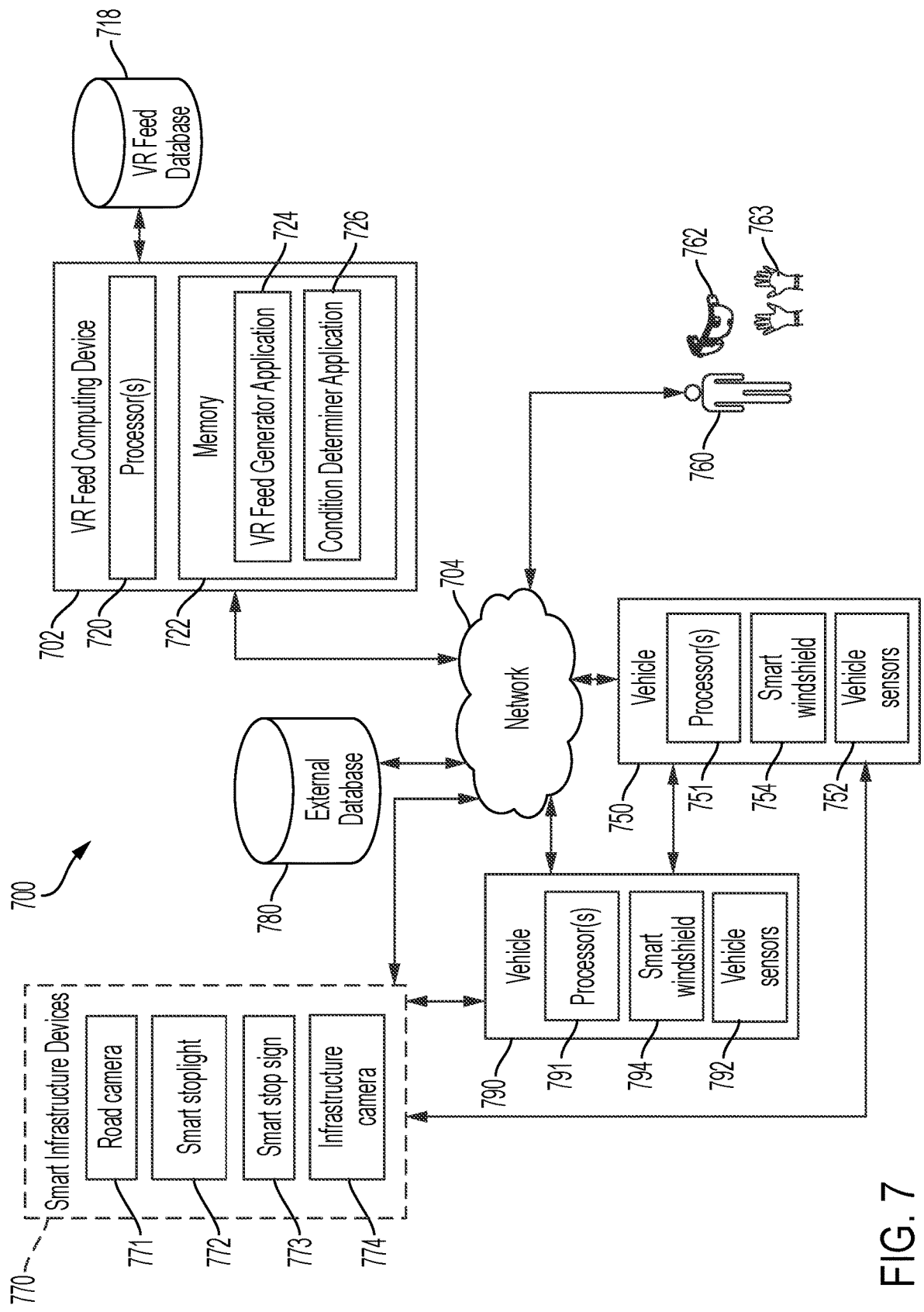
FIG. 7 illustrates an exemplary system for presenting real-time road conditions.

FIG. 7 shows an exemplary computer system 700 for presenting real-time road conditions. The high-level architecture includes both hardware and software applications, as well as various data communications channels for communicating data between the various hardware and software components.

With reference thereto, a user 760 may have VR goggles or a VR headset 762, which may be controlled by VR gloves 763. The user 760 may potentially be the driver of the vehicle 750.

The vehicle 750 may be an autonomous vehicle (e.g., a vehicle capable of driving autonomously, semi-autonomously, or in a manual mode, etc.). In this regard, the vehicle 750 may have autonomous operation features that may take full control of the vehicle under certain conditions, viz. fully autonomous operation, or the autonomous operation features may assist the vehicle operator in operating the vehicle, viz. partially autonomous operation. Fully autonomous operation features may include systems within the vehicle that pilot the vehicle to a destination with or without a vehicle operator present (e.g., an operating system for a driverless car). Partially autonomous operation features may assist the vehicle operator in limited ways (e.g., automatic braking or collision avoidance systems). Fully or partially autonomous operation features may perform specific functions to control or assist in controlling some aspect of vehicle operation, or such features may manage or control other autonomous operation features. For example, a vehicle operating system may control numerous subsystems that each fully or partially control aspects of vehicle operation.

In addition to information regarding the position or movement of a vehicle, autonomous operation features may collect and utilize other information, such as data about other vehicles or control decisions of the vehicle. Such additional information may be used to improve vehicle operation, route the vehicle to a destination, warn of component malfunctions, advise others of potential hazards, or for other purposes described herein. Information may be collected, assessed, and/or shared via applications installed and executing on computing devices associated with various vehicles or vehicle operators, such as on-board computers of vehicles or smartphones of vehicle operators. By using computer applications to obtain data, the additional information generated by autonomous vehicles or features may be used to assess the autonomous features themselves while in operation or to provide pertinent information to non-autonomous vehicles through an electronic communication network 704 (which may be a wired and/or wireless network, such as the internet). These and other advantages are further described below.

Some autonomous operation features may be adapted for use under particular conditions, such as city driving or highway driving. Additionally, the vehicle operator may be able to configure settings relating to the features or may enable or disable the features at will. Therefore, some embodiments monitor use of the autonomous operation features, which may include the settings or levels of feature use during vehicle operation. Information obtained by monitoring feature usage may be used to determine risk levels associated with vehicle operation, either generally or in relation to a vehicle operator. In such situations, total risk may be determined by a weighted combination of the risk levels associated with operation while autonomous operation features are enabled (with relevant settings) and the risk levels associated with operation while autonomous operation features are disabled. For fully autonomous vehicles, settings or configurations relating to vehicle operation may be monitored and used in determining vehicle operating risk.

In some embodiments, information regarding the risks associated with vehicle operation with and without the autonomous operation features may be used to determine risk categories or premiums for a vehicle insurance policy covering a vehicle with autonomous operation features, as described elsewhere herein. Risk category or price may be determined based upon factors relating to the evaluated effectiveness of the autonomous vehicle features. The risk or price determination may also include traditional factors, such as location, vehicle type, and level of vehicle use.

The vehicle 750 may have various vehicle sensors 752. The vehicle sensors 752 may be any kind of sensors. Examples of the vehicle sensors 752 include: cameras (e.g., for capturing images and/or video), light detection and ranging (LIDAR) cameras, radio detection and ranging (RADAR) devices, accelerometers, gyroscopes, compasses, speedometers, magnetometers, barometers, thermometers, proximity sensors, light sensors (e.g., light intensity detectors), electromagnetic radiation sensors (e.g., infrared and/or ultraviolet radiation sensors), ultrasonic and/or infrared range detectors, humistors, hygrometers, altimeters, microphones, audio or video recorders, etc. Additional examples vehicle sensors 752 include advanced sensors, for example, that detect and/or receive data associated with temperature measurements, thermal imaging, weather conditions, traffic conditions, etc. The vehicle 750 may include any number or combination of vehicle sensors 752.

The vehicle 750 may further include one or more processors 751, such as one or more microprocessors, controllers, and/or any other suitable type of processor. The one or more processors 751 may perform any functions. For example, the one or more processors 751 may control the vehicle 751 while it is driving in an autonomous or semi-autonomous mode. In another example, the one or more processors 751 may switch the vehicle 750 between manual, autonomous, and semi-autonomous modes. As will be discussed further below, the one or more processors 751 may perform any of the functions of the VR feed generator application 724 and/or the condition determiner application 726.

The vehicle 750 may further include a smart windshield 754. The smart windshield 754 may be configured to produce a VR or augmented reality (AR) display, respectively, from a VR feed or AR feed.

The example of FIG. 7 also illustrates vehicle 790, which, in some examples, may be a vehicle on a road traveling ahead of vehicle 750. Similarly to the vehicle 750, the vehicle 790 may be an autonomous vehicle. The vehicle 790 may also have sensors 792, which may be any kind of sensors, such as those discussed above with respect to vehicle sensors 752. The vehicle 790 may also have one or more processors 791, such as one or more microprocessors, controllers, and/or any other suitable type of processor. The one or more processors 791 may perform any functions. For example, the one or more processors 791 may control the vehicle 790 while it is driving in an autonomous or semi-autonomous mode. In another example, the one or more processors 791 may switch the vehicle 790 between manual, autonomous, and semi-autonomous modes. It should be understood that the discussions above regarding autonomous vehicles, processors, and sensors with respect to vehicle 750 apply also to vehicle 790.

One or both of the vehicles 750, 790 may be in communication with smart infrastructure devices 770. Examples of the smart infrastructure devices include road camera 771, smart stoplight 772, smart stop sign 773, and infrastructure camera 774. Any of the smart infrastructure devices 770 may include any kind of sensors. For example, any of the smart infrastructure devices 770 may include: cameras (e.g., for capturing images and/or video), light detection and ranging (LIDAR) cameras, radio detection and ranging (RADAR) devices, accelerometers, gyroscopes, compasses, speedometers, magnetometers, barometers, thermometers, proximity sensors, light sensors (e.g., light intensity detectors), electromagnetic radiation sensors (e.g., infrared and/or ultraviolet radiation sensors), ultrasonic and/or infrared range detectors, humistors, hygrometers, altimeters, microphones, audio or video recorders, thermal imaging devices, etc. Furthermore, any of the smart infrastructure devices 770 may include multiple sensors (e.g., any combination of the example sensors just listed).

As mentioned above, the techniques described herein advantageously allow the user 760 to use a VR display, such as the VR goggles 760 and/or the smart windshield 754, to preview a road segment. (Regarding the use of the smart windshield 754 as a VR display, it may be noted that although the example of FIG. 7 illustrates the user 760 outside of the vehicle 750, in some examples, the user 760 enters the vehicle 750, e.g., to become the driver of the vehicle 750.)

To this end, VR feed computing device 702 may be used to generate a VR feed of a road segment based upon the real-time condition data. The VR feed computing device 702 may include one or more processors 720 such as one or more microprocessors, controllers, and/or any other suitable type of processor. The VR feed computing device 702 may further include a memory 722 (e.g., volatile memory, non-volatile memory) accessible by the one or more processors 720, (e.g., via a memory controller).

The one or more processors 720 may interact with the memory 722 to obtain, for example, computer-readable instructions stored in the memory 722. Additionally or alternatively, computer-readable instructions may be stored on one or more removable media (e.g., a compact disc, a digital versatile disc, removable flash memory, etc.) that may be coupled to the VR feed computing device 702 to provide access to the computer-readable instructions stored thereon. In particular, the computer-readable instructions stored on the memory 722 may include instructions for executing various applications, such as a VR feed generator application 724, and/or a condition determiner application 726.

In some examples, the VR feed generator application 724 may generate a VR feed to preview a road segment. The data that the VR feed generator application 724 uses to generate the VR feed may come from any suitable source, such as the smart infrastructure devices 770, VR feed database 718, and/or the external database 780.

To this end, the external database 780 may hold any suitable data. Examples of the data held by external database 780 include historical image data of road segments, historical video data of road segments, and/or historical VR data of road segments. Additional examples include data relating to current road conditions, such as traffic data, weather data, road condition data, etc.

The VR feed database 718 may also hold any suitable data. Examples of the data held by external database 780 include historical image data of road segments, historical video data of road segments, and/or historical VR data of road segments. Additional examples include data relating to current road conditions, such as traffic data, weather data, road condition data, etc. The VR feed database 718 may also store information of the VR feed as it is generated. For example, the VR feed database 718 may store a copy of the generated VR feed itself. Additionally, or alternatively, the VR feed database 718 may store information of when and where the VR feed was sent.

Figure 8:
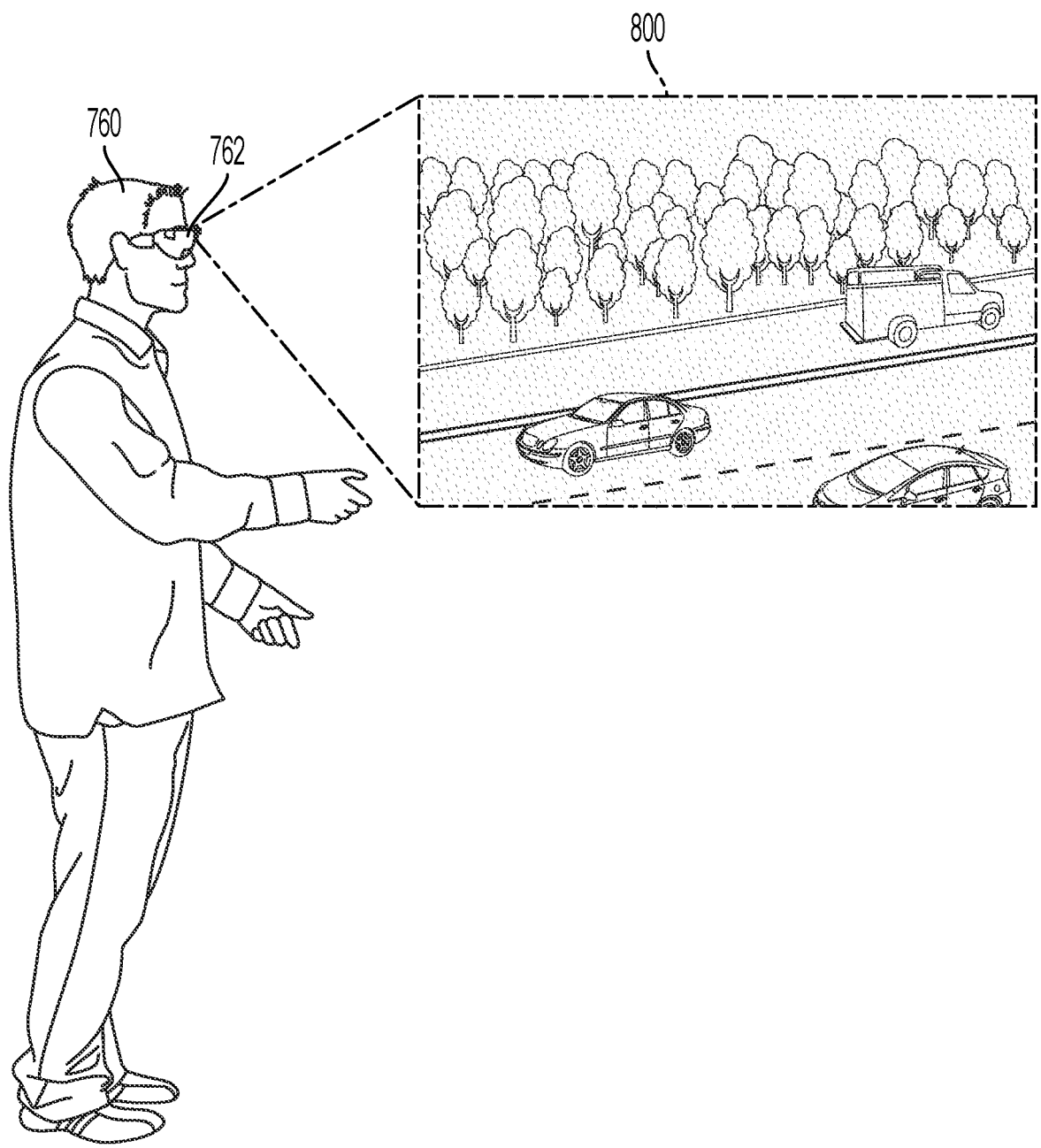
FIG. 8 illustrates an exemplary VR display depicting real-time rainy conditions of a real-world road.

The VR feed generated by the VR feed generator application 724 may include a virtual representation of the road segment to reflect the real-time conditions at the road segment, and thus may be provided as a display to the user 760. In this regard, FIG. 8 illustrates an exemplary display 800 showing the real-time conditions at a road segment. The illustrated example further shows that there is a weather condition (e.g., rain) occurring on the road segment.

Figure 9:
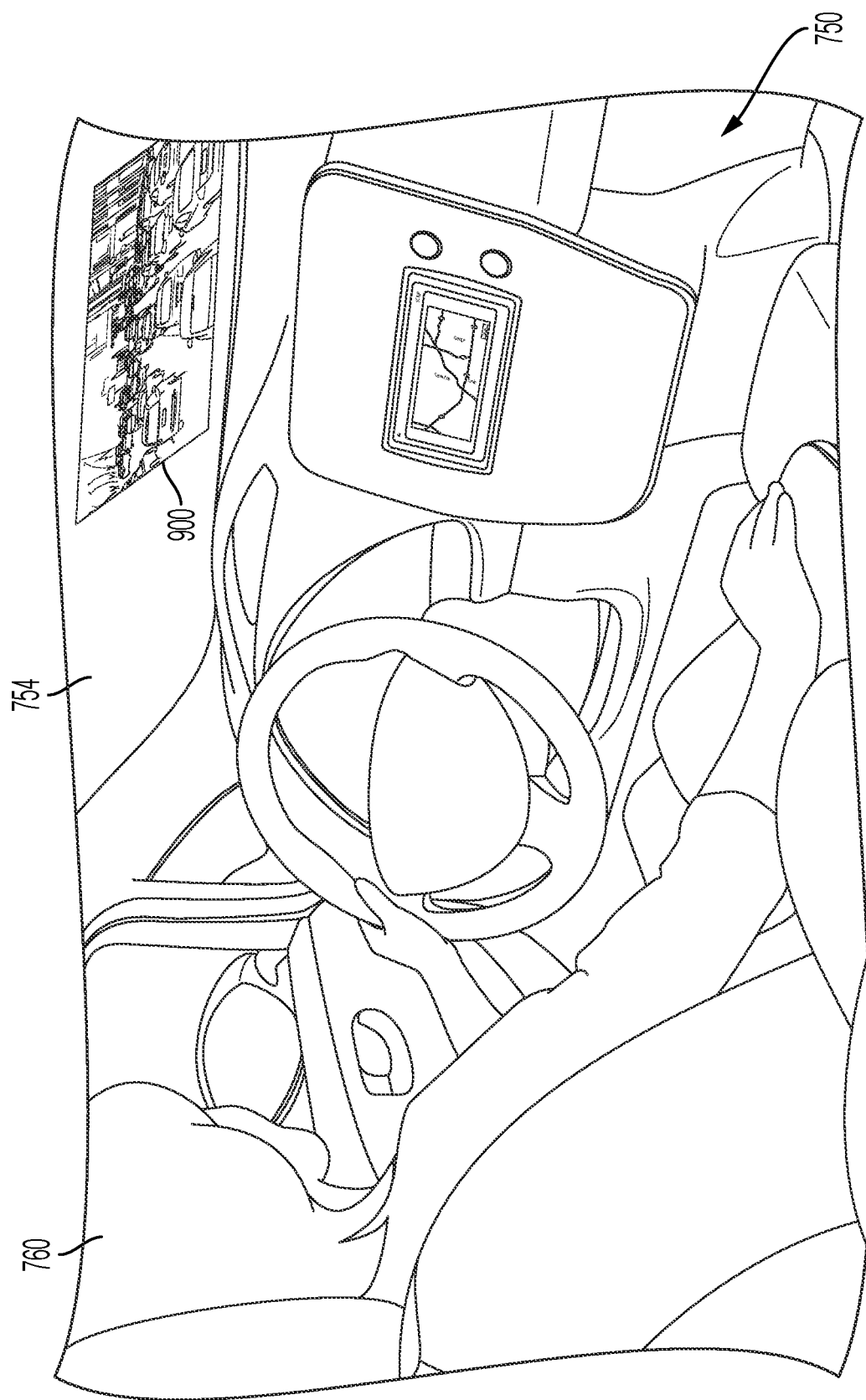
FIG. 9 illustrates an exemplary VR display depicting real-time traffic conditions of a real-world road.

An additional example of the VR feed generated by the VR feed generator application 724 is shown by FIG. 9. Specifically, FIG. 9 illustrates an exemplary display 900 showing the real-time conditions at a road segment. The illustrated example further shows that there is a traffic condition occurring on the road segment. In the example of FIG. 9, the driver 760 is viewing the example display 900 on the smart windshield 754.

Conditions, such as the weather condition of FIG. 8 and the traffic condition of FIG. 9, may be determined by the condition determiner application 726. More broadly, the condition determiner application 726 may determine any kind of condition. Examples of conditions include weather conditions (e.g., rain, snow, hail, natural disaster, etc.), traffic conditions (e.g., a light traffic condition, a medium traffic condition, a heavy traffic condition, etc.), accident conditions, road conditions, congestion, construction, etc.

Any suitable data may be used to determine the conditions. For instance image and/or video data from a smart infrastructure device 770 may be analyzed to determine any of the conditions. The analysis may be done with or without a machine learning algorithm.

Figure 10:
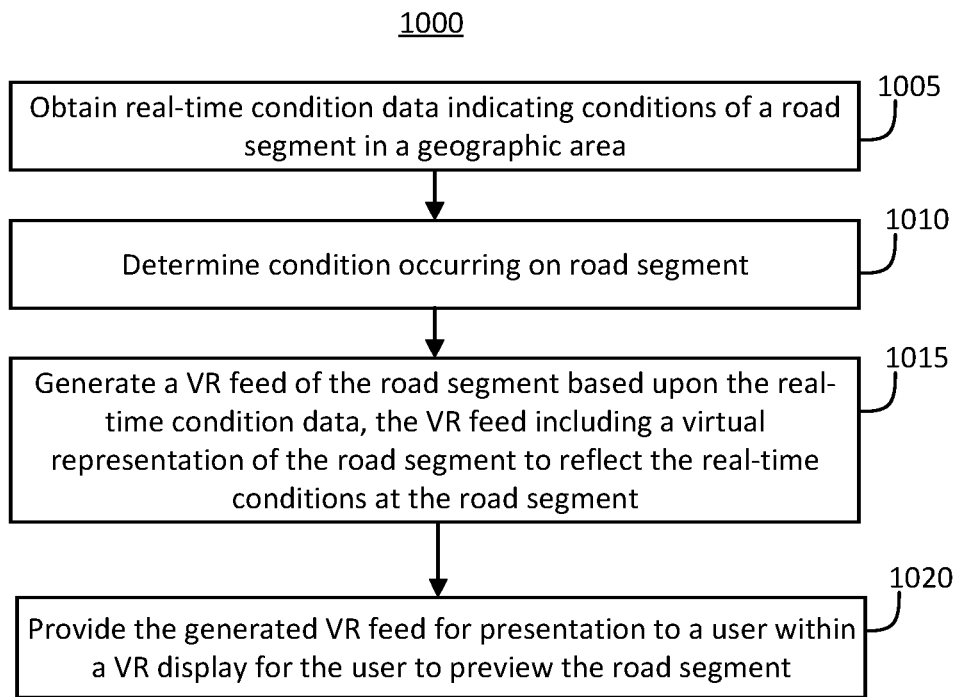
FIG. 10 illustrates a flow diagram of an exemplary computer-implemented method for presenting real-time road conditions.

Exemplary Methods for Generating a VR Feed for Presenting Real-Time Road Conditions FIG. 10 shows an exemplary implementation 1000 of generating a VR feed for presenting real-time road conditions. Although the following discussion refers to many of the blocks of the exemplary implementation 1000, as well as the example implementations 1100, 1200 of FIGS. 11 and 12, as being performed by the one or more processors 720, it should be understood that any of the blocks or functions of the example implantations 1000, 1100, 1200 may be performed by either of the one or more processors 720 of the VR feed computing device 702, or the one or more processors 751 of the vehicle 750.

The exemplary implementation 1000 begins at block 1005 when the one or more processors 720 obtain real-time condition data indicating condition of a road segment in a geographic area. The real-time condition data may be obtained from any suitable source. For example, the real-time condition data may be obtained from any smart infrastructure device 770 (e.g., road camera 771, smart stoplight 772, smart stop sign 773, infrastructure camera 774, etc.), external database 780, sensors of a vehicle (e.g., vehicle sensors 792), AR or VR headsets (e.g., camera(s) mounted on AR or VR headsets), etc. Examples of the real-time condition data include imagery data (e.g., image data, video data, LIDAR data, RADAR data, infrared data, etc.), audio data, weather data, traffic data, etc.

At block 1010, the one or more processors 720 determine a condition occurring on the road segment. Examples of the condition include a weather condition (e.g., a rain condition [e.g., FIG. 8], a snow condition, an ice condition, a hail condition, a natural disaster condition, etc.), a traffic condition (e.g., FIG. 9), a construction condition, a poor road condition, etc.

Furthermore, the conditions may have grades associated with them. For example, a traffic condition may be a light traffic condition, a medium traffic condition, a heavy traffic condition, etc. In another example, the weather condition may be a light weather condition, a severe weather condition, etc.

The condition may be determined using any suitable technique. For example, the determination may be made based on the real-time condition data obtained at block 1005. For instance, imagery data, and/or audio data of the real-time condition data may be analyzed to determine the condition.

In one example, audio data may be analyzed to determine a weather condition (e.g., a rain, snow, or ice condition or a hail, storm, or wind condition). In another example, imagery data may be used to determine a traffic condition (e.g., imagery data indicates that the density of vehicles on the road segment (or a portion thereof) is above a threshold). In yet another example, a poor road condition may be determined when it is determined that a road has a density of potholes with a depth greater than a predetermined value.

To this end, a machine learning algorithm(s) may be used to determine the condition. For example, the real-time condition data may be input into a trained machine learning algorithm to determine the condition. Furthermore, the machine learning algorithm may have been trained by any suitable technique (e.g., supervised learning, unsupervised learning, semi-supervised learning). Examples of the machine learning algorithm may include neural networks, deep learning algorithms, etc.

At block 1015, the one or more processors 720 generate a VR feed of the road segment based upon the real-time condition data.

In some embodiments, the generation of the VR feed of the road segment occurs in response to the determination that there is a condition at block 1010. For example, the one or more processors 720 may be continually analyzing the real-time condition data; and, when a condition is found, the VR feed is generated. Advantageously, generating the VR feed upon the determination of the condition saves processing power (e.g., of the one or more processors 720), and/or bandwidth (e.g., the VR feed is only generated/transmitted when necessary, thus saving processing power, and bandwidth).

However, in other embodiments, the VR feed is continually generated, and then transmitted only upon the determination of the condition. For example, the VR feed may be continually generated from real-time condition data from smart infrastructure devices 770, but then transmitted (e.g., to the vehicle 750, and/or VR goggles 762, etc.) only upon a determination of a condition (e.g., at block 1010). It may be noted that these embodiments advantageously save bandwidth (e.g., because the VR feed does not need to be continuously transmitted), but have the drawback of not saving processing power (e.g., because the VR feed is continually being generated).

In some embodiments, it may be useful for the driver of a vehicle to view what is happening ahead of his vehicle. As such, in some embodiments, the VR feed may be generated from data from a vehicle directly ahead of a vehicle that the user 760 is traveling in, such that the user 760 may have a VR view of what is happening ahead of his vehicle. Furthermore, the generation of the VR feed may be triggered by the particular type of condition. For instance, a poor road condition (e.g., due to a high density of potholes) shortly ahead of the vehicle 750 may trigger generation of a VR feed from vehicle(s) ahead of the vehicle 750.

The VR feed may be generated by any suitable technique. For example, the VR feed may be generated based upon data from a single device (e.g., from any of the smart infrastructure devices 770, from a sensor of the vehicle 790, etc.). Alternatively, the VR feed may be generated based upon data from multiple devices. In some embodiments, the VR feed is generated based upon different devices with different device types. For example, the VR feed may be generated from: (i) a first smart infrastructure device 770 comprising a video camera, and (ii) a second smart infrastructure device 770 comprising a LIDAR camera.

At block 1020, the generated VR feed is provided to the user 760 for presentation within a VR display (e.g., the VR goggles 762, smart windshield 754, etc.). It may be noted that the user 760 may or may not be located in the vehicle 750. Advantageously, if the user is not located in the vehicle 750 (e.g., the user is at home with the VR goggles 762), the user 760 may determine if she wants to embark on a trip based on the condition depicted in the VR feed.

Figure 11:
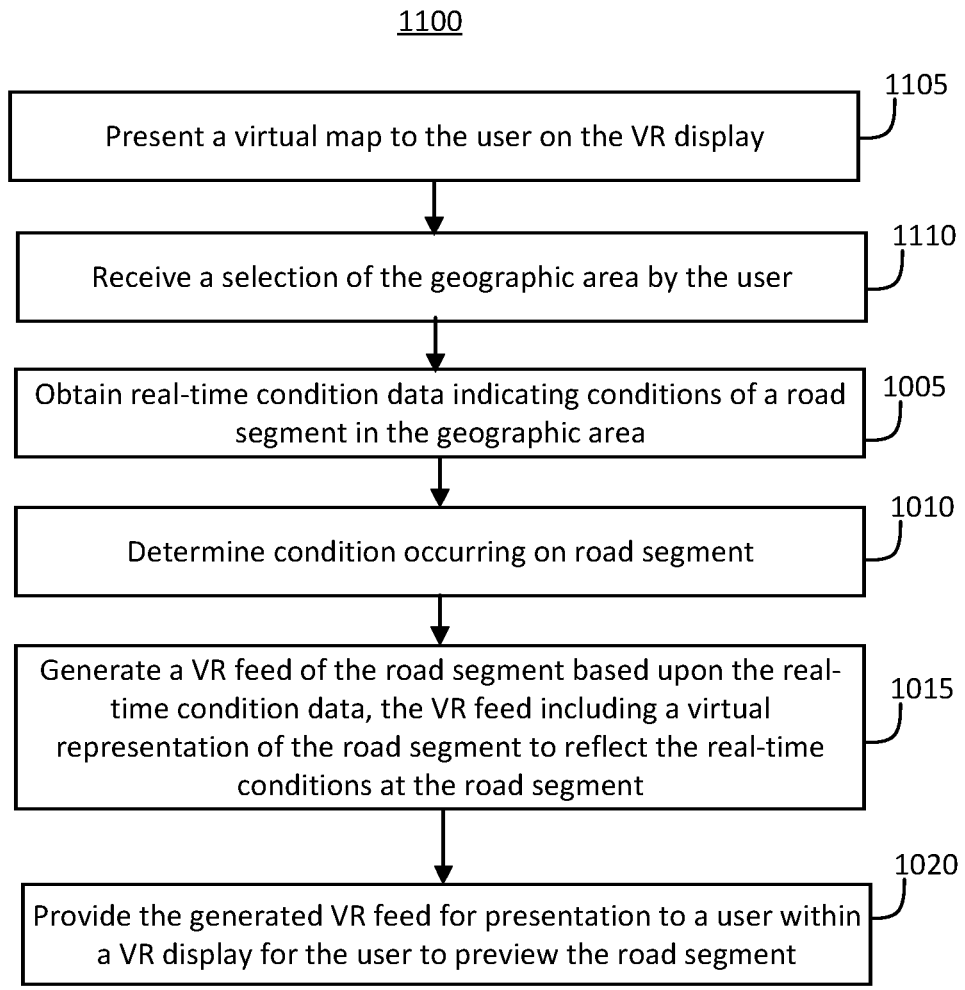
FIG. 11 illustrates a flow diagram of an exemplary computer-implemented method for presenting real-time road conditions, including selecting a geographic area by the user.

FIG. 11 shows an exemplary implementation 1100, including a selection of a geographic area by the user 760. The exemplary implementation 1100 begins at block 1105 when the user 760 is presented with a virtual map on the virtual display (e.g., the VR goggles 762, smart windshield 754, etc.). In some embodiments, the virtual map may be partitioned into geographic areas (e.g., sections), therefore allowing the user 760 to easily select any of the geographic areas by clicking on a desired geographic area. In some examples, the geographic areas are geometric sections (e.g., squares, rectangles, polygons, etc.) on the map. In other embodiments, the geographic areas are roads (e.g., a section of road a quarter mile long). In yet other embodiments, the geographic areas are based upon geographical boundaries (e.g., based upon neighborhoods, counties, communities, city boundaries, etc.).

At block 1100, the one or more processors 720 receives a selection of a geographic area from the user 760. If the virtual map has been segmented in any way, the user 760 may select the geographic area by clicking on the geographic area. In some embodiments where the virtual map has not been segmented, the user may select the geographic area by "drawing" on the map. For example, the user may circle an area on the map to create (and therefore select) the geographic area.

In some embodiments, the user 760 may make a voice selection of the geographic area. For example, the user 760 may say, "select southwest corner of Chicago." This voice selection is advantageous in implementations where the user 760 is wearing VR goggles 762 that do not receive inputs easily allowing for a selection on the presented virtual map.

Following block 1110, at block 1005, the one or more processors 720 obtain real-time condition data indicating conditions of the road segment in the geographic area (e.g., selected at block 1110). This occurs substantially as in block 1005 of FIG. 10; however, in some embodiments, the obtaining of the real-time condition data at block 1005 occurs in response to the selection at block 1110.

Blocks 1010-1020 occur substantially as in the exemplary implementation 1000 of FIG. 10.

Figure 12:
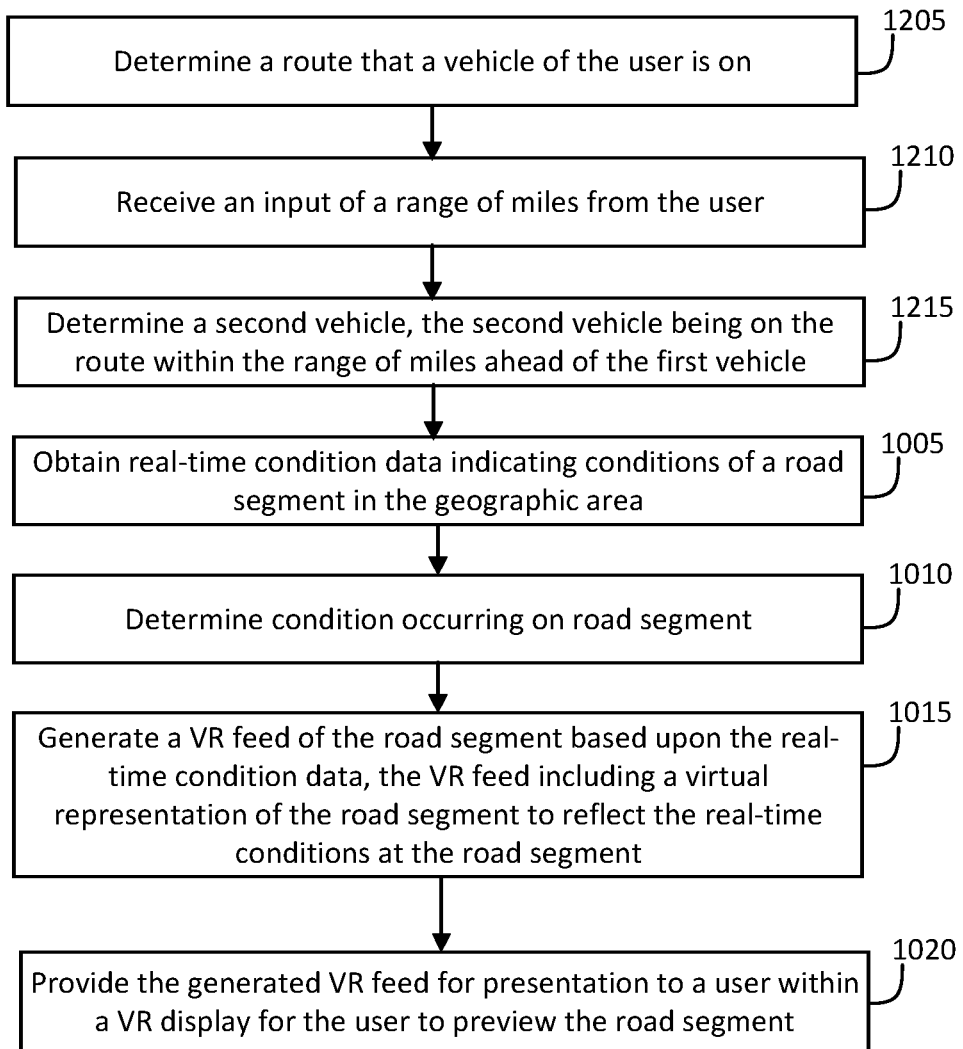

FIG. 12 shows an exemplary implementation 1200, including determining a route that the vehicle 750 is on. The exemplary implementation 1200 begins at block 1205 when the one or more processors 720 determine a route that a vehicle 750 is on. The route may be determined by any suitable method. For example, the route may be received as input (e.g., into a smartphone of the user 760, into a GPS device of the vehicle 750, etc.) by the user 760.

In other examples, the route may be determined via a prediction made by the one or more processors 120. For example, the one or more processors may predict the route (possibly including predicting the destination) based upon current location, trip staring location, time of day, previous routes of travel, previous destinations, profile information (e.g., of the vehicle 750, and/or user 760), direction of travel, speed of travel, etc.

Once the route has been determined, the one or more processors 120 may receive an input of a range of miles from the user (block 1210). The range of miles may be a range of miles on the route ahead of the user. For example, the user may input a range 2-4 miles. In some embodiments, such as in the example implementation 1200, the range of miles on the route is the road segment (e.g., of the geographic area) that the VR feed will preview.

At block 1215, the one or more processors 720 may determine a second vehicle (e.g., vehicle 790) within the range of miles (received at block 1210) ahead of the vehicle 750 on the route.

The one or more processors 720 may also make a determination(s) of whether or not the second vehicle 790 (determined at block 1210) is: capable of transmitting real-time condition data, and/or (ii) has consented to transmit real-time condition data. For example, the one or more processors 720 may receive automatically broadcast data from the second vehicle 790 (e.g., through the network 704), and make this determination based upon the received data. Additionally or alternatively, the one or more processors 720 may make this determination by using identification information of the second vehicle 790 to look up this information in a database (e.g., external database 780).

Following block 1150, at block 1205, the one or more processors 720 obtain real-time condition data indicating conditions of the road segment (e.g., the range of miles input at block 1210) in the geographic area. For example, the obtained real time condition data may include data generated by a smart camera of the second vehicle 790.

Block 1205 occurs substantially as in block 1005 of FIG. 10; however, in some embodiments, the obtaining of the real-time condition data at block 1205 occurs in response to receiving the input at block 1210, and determining the second vehicle at block 1215.

Further, at block 1215, as part of obtaining the real-time condition data, the one or more processors 720 may send a request to the second vehicle 790 for real-time condition data. In response, the second vehicle 790 may send the real-time condition data to the vehicle 750. Alternatively, in some embodiments, the second vehicle automatically sends real-time condition data to the external database 780; thus, in these embodiments, the one or more processors 720 may obtain the real-time condition data from the external database 780, rather than request permission from the second vehicle 790.

Blocks 1010-1020 occur substantially as in the exemplary implementations 1000, 1100 of FIGS. 10 and 11.

It should be understood that not all blocks of the exemplary flowcharts 500, 600, 1000, 1100, 1200 are required to be performed. Moreover, the exemplary flowcharts 500, 600, 1000, 1100, 1200 are not mutually exclusive (e.g., block(s) from each exemplary flowchart 500, 600, 1000, 1100, 1200 may be performed in any other flowchart). The exemplary flowcharts 500, 600, 1000, 1100, 1200 may include additional, less, or alternate functionality, including that discussed elsewhere herein.

Applicability to the Insurance Industry

Some embodiments have particular applicability to the insurance industry. For example, discounts to insurance premiums may be provided by the techniques described herein. For instance, if a user 760 agrees to allow her vehicle to send real-time condition data (e.g., to the external database 780, thereby allowing others to preview severe weather and/or other dangerous conditions), the user 760 may receive a discount on an insurance premium.

In one aspect, data from the vehicle 750, and/or other data, including the types of data discussed elsewhere herein, may be collected or received by an insurance provider remote server, such as via direct or indirect wireless communication or data transmission from a smart home controller, mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to autonomous vehicles.

Exemplary Use of Generating a VR Feed for Presenting Real-Time Road Conditions

In one aspect, a computer-implemented method for generating a virtual reality (VR) feed for presenting real-time road conditions may be provided. The method may include:

(1) obtaining, via one or more processors, real-time condition data indicating conditions of a road segment in a geographic area; (2) generating, via the one or more processors, a VR feed of the road segment based upon the real-time condition data, the VR feed including a virtual representation of the road segment to reflect the real-time conditions at the road segment; and/or (3) providing, via the one or more processors, the generated VR feed for presentation to a user within a VR display for the user to preview the road segment. The method may include additional, fewer, or alternate actions, including those discussed elsewhere herein.

For instance, the real-time condition data may include (i) weather data, (ii) traffic data, and/or (iii) imagery data from: smart glasses, AR/VR headsets, smart vehicle cameras, and/or vehicles or passengers ahead of the user. In some embodiments, the VR display may include a display via VR goggles or a smart windshield display.

In some embodiments, the method may further include: determining, via the one or more processors, that a weather condition is occurring on the road segment; and/or wherein generating the VR feed of the road segment occurs in response to the determination that the weather condition is occurring on the road segment.

In certain embodiments, the method may further include determining, via the one or more processors, that a traffic condition is occurring on the road segment; and/or wherein generating the VR feed of the road segment occurs in response to the determination that the traffic condition is occurring on the road segment.

In some embodiments, the VR display may include a smart windshield display; and/or the real-time condition data may include data generated by a smart vehicle camera of a vehicle directly ahead of a vehicle that the user is traveling in. Additionally or alternatively, the VR display may include a smart windshield display, and/or the method may further include: determining, via the one or more processors, a route that a vehicle of the user is on, wherein the vehicle is a first vehicle; receiving, via the one or more processors, an input of a range of miles from the user; and/or determining, via the one or more processors, a second vehicle, the second vehicle being on the route within the range of miles ahead of the first vehicle; and/or wherein the real-time condition data includes data generated by a smart camera of the second vehicle.

In some embodiments, obtaining the real-time condition data indicating the conditions of the road segment in the geographic area may occur in response to a selection from the user of the geographic area.

In certain embodiments, the method may further include, prior to obtaining the real-time condition data: presenting, via the one or more processors, a virtual map to the user on the VR display, wherein the virtual map includes the geographic area; and/or receiving, via the one or more processors, a selection of the geographic area by the user; and/or wherein obtaining the real-time condition data occurs in response to the selection of the geographic area by the user.

In another aspect, a computer system configured to generate a virtual reality (VR) feed for presenting real-time road conditions may be provided. The computer system may include one or more local or remote processors, transceivers, and/or sensors configured to: (1) obtain real-time condition data indicating conditions of a road segment in a geographic area; (2) generate a VR feed of the road segment based upon the real-time condition data, the VR feed including a virtual representation of the road segment to reflect the real-time conditions at the road segment; and/or (3) provide the generated VR feed for presentation to a user within a VR display for the user to preview the road segment. The computer system may include additional, less, or alternate functionality, including that discussed elsewhere herein.

For instance, the real-time condition data may include (i) weather data, (ii) traffic data, and/or (iii) imagery data from: smart glasses, AR/VR headsets, smart vehicle cameras, and/or vehicles or passengers ahead of the user. In some embodiments, the VR display may include a display via VR goggles or a smart windshield display.

In some embodiments, the one or more local or remote processors, transceivers, and/or sensors may be further configured to: determine that a weather condition is occurring on the road segment; and/or wherein generation of the VR feed of the road segment occurs in response to the determination that the weather condition is occurring on the road segment.

In certain embodiments, the one or more local or remote processors, transceivers, and/or sensors may be further configured to: determine that a traffic condition is occurring on the road segment; and/or wherein generating the VR feed of the road segment occurs in response to the determination that the traffic condition is occurring on the road segment. Additionally or alternatively, the VR display may include a smart windshield display; and/or the real-time condition data may include data generated by a smart vehicle camera of a vehicle directly ahead of a vehicle that the user is traveling in.

In yet another aspect, a computer device for generating a virtual reality (VR) feed for presenting real-time road conditions, the computer device comprising: one or more processors; and one or more memories coupled to the one or more processors. The one or more memories including computer executable instructions stored therein that, when executed by the one or more processors, cause the one or more processors to: (1) obtain real-time condition data indicating conditions of a road segment in a geographic area; (2) generate a VR feed of the road segment based upon the real-time condition data, the VR feed including a virtual representation of the road segment to reflect the real-time conditions at the road segment; and/or (3) provide the generated VR feed for presentation to a user within a VR display for the user to preview the road segment. The computer device may include additional, less, or alternate functionality, including that discussed elsewhere herein.

For instance, the real-time condition data may include (i) weather data, (ii) traffic data, and/or (iii) imagery data from: smart glasses, AR/VR headsets, smart vehicle cameras, and/or vehicles or passengers ahead of the user. In some embodiments, the VR display may include a display via VR goggles or a smart windshield display.

In some embodiments, the one or more memories including computer executable instructions stored therein that, when executed by the one or more processors, may further cause the one or more processors to: determine that a weather condition is occurring on the road segment; and/or generation of the VR feed of the road segment occurs in response to the determination that the weather condition is occurring on the road segment.

In certain embodiments, the one or more memories including computer executable instructions stored therein that, when executed by the one or more processors, may further cause the one or more processors to: determine that a traffic condition is occurring on the road segment; and/or generating the VR feed of the road segment occurs in response to the determination that the traffic condition is occurring on the road segment.

Exemplary System for Generating a VR Feed Corresponding to an Event

Some embodiments relate to generating a VR feed corresponding to an event. For example, a user may be preparing to leave her home for an upcoming trip. However, shortly before the user is about to leave, there may be a vehicle collision on a route that the user was about to take. As such, it would be useful to the user to obtain information of the vehicle collision so that he may determine if an alternate route (or even cancelling or postponing the trip) is desirable. As disclosed herein, in this example, a VR feed may be provided to the user so that the user can experience the geographic area where the collision occurred within a VR environment, thus allowing the user to determine if taking an alternate route is warranted.

Figure 13:
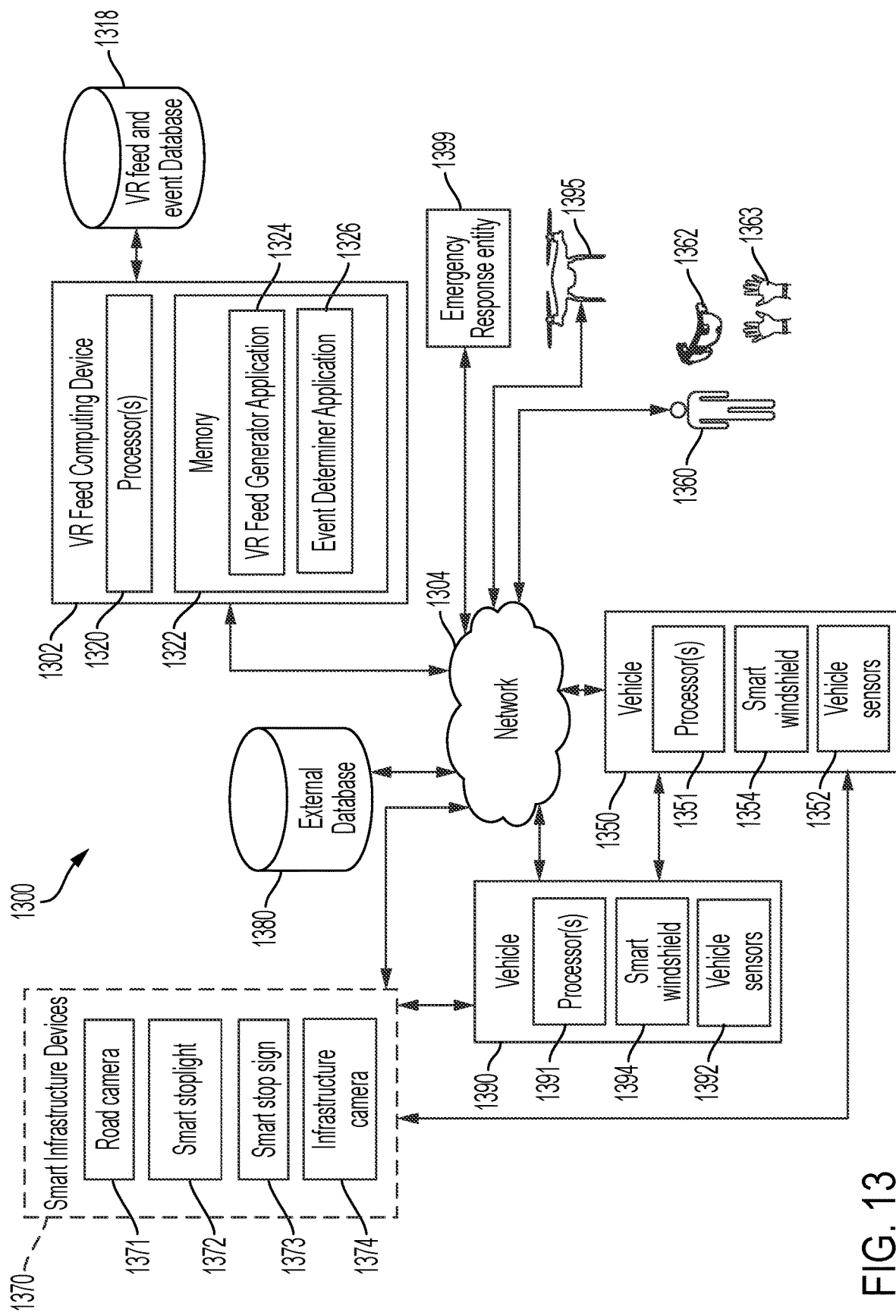
FIG. 13 shows an exemplary computer system for generating a VR feed corresponding to an event.

To this end, FIG. 13 shows an exemplary computer system 1300 for generating a VR feed corresponding to an event (e.g., a vehicle collision, a crime, a weather event, or a natural disaster). The high-level architecture includes both hardware and software applications, as well as various data communications channels for communicating data between the various hardware and software components.

Broadly speaking, the VR feed computing device 1302 may obtain an indication of an event occurring in a geographic area. The VR feed computing device 1302 may then generate a VR feed of the geographic area at a time of the event based upon real-time condition data from the geographic area, thereby allowing a user 1360 to experience the geographic area where the event occurred within a VR environment (e.g., view the geographic area on a VR display, such as VR goggles 1362 possibly controlled by VR gloves 1363, smart windshield 1354, etc.).

The VR feed computing device 1302 may include one or more processors 1320 such as one or more microprocessors, controllers, and/or any other suitable type of processor. The VR feed computing device 1302 may further include a memory 1322 (e.g., volatile memory, non-volatile memory) accessible by the one or more processors 1320, (e.g., via a memory controller).

The one or more processors 1320 may interact with the memory 1322 to obtain, for example, computer-readable instructions stored in the memory 1322. Additionally or alternatively, computer-readable instructions may be stored on one or more removable media (e.g., a compact disc, a digital versatile disc, removable flash memory, etc.) that may be coupled to the VR feed computing device 1302 to provide access to the computer-readable instructions stored thereon. In particular, the computer-readable instructions stored on the memory 1322 may include instructions for executing various applications, such as a VR feed generator application 1324, and/or an event determiner application 1326.

In some examples, the VR feed generator application 1324 may generate a VR feed to allow a user 1360 to experience the geographic area where the event occurred within a VR environment. The data that the VR feed generator application 1324 uses to generate the VR feed may come from any suitable source, such as the smart infrastructure devices 1370, VR feed and event database 1318, and/or the external database 1380. To this end, the external database 1380 may hold any suitable data. Examples of the data held by external database 1380 include historical image data of geographic areas, historical video data of geographic areas, and/or historical VR data of geographic areas. Additional examples include data relating to current conditions in geographic areas, such as traffic data, crime data, weather data, road condition data, etc.

The VR feed and event database 1318 may also hold any suitable data. Examples of the data held by the VR feed and event database 1318 include historical image data of road segments, historical video data of road segments, and/or historical VR data of road segments. Additional examples include current data of geographic areas, such as traffic data, vehicle collision data, crime data, weather data, road condition data, etc. The VR feed and event database 1318 may also store information of the VR feed as it is generated. For example, the VR feed and event database 1318 may store a copy of the generated VR feed itself. Additionally, or alternatively, the VR feed and event database 1318 may store information of when and where the VR feed was sent.

In some embodiments, the user 1360 may experience the geographic area (via the VR feed provided by the VR feed generator application 1324) while she is at home, or not in any vehicle. However, in some examples, the user 1360 may be inside of a vehicle, such as vehicle 1350.

The vehicle 1350 may be an autonomous vehicle (e.g., a vehicle capable of driving autonomously, semi-autonomously, or in a manual mode, etc.). In this regard, the vehicle 1350 may have autonomous operation features that may take full control of the vehicle under certain conditions, viz. fully autonomous operation, or the autonomous operation features may assist the vehicle operator in operating the vehicle, viz. partially autonomous operation. Fully autonomous operation features may include systems within the vehicle that pilot the vehicle to a destination with or without a vehicle operator present (e.g., an operating system for a driverless car). Partially autonomous operation features may assist the vehicle operator in limited ways (e.g., automatic braking or collision avoidance systems). Fully or partially autonomous operation features may perform specific functions to control or assist in controlling some aspect of vehicle operation, or such features may manage or control other autonomous operation features. For example, a vehicle operating system may control numerous subsystems that each fully or partially control aspects of vehicle operation.

In addition to information regarding the position or movement of a vehicle, autonomous operation features may collect and utilize other information, such as data about other vehicles or control decisions of the vehicle. Such additional information may be used to improve vehicle operation, route the vehicle to a destination, warn of component malfunctions, advise others of potential hazards, or for other purposes described herein. Information may be collected, assessed, and/or shared via applications installed and executing on computing devices associated with various vehicles or vehicle operators, such as on-board computers of vehicles or smartphones of vehicle operators. By using computer applications to obtain data, the additional information generated by autonomous vehicles or features may be used to assess the autonomous features themselves while in operation or to provide pertinent information to non-autonomous vehicles through an electronic communication network 1304 (which may be a wired and/or wireless network, such as the internet). These and other advantages are further described below.

Some autonomous operation features may be adapted for use under particular conditions, such as city driving or highway driving. Additionally, the vehicle operator may be able to configure settings relating to the features or may enable or disable the features at will. Therefore, some embodiments monitor use of the autonomous operation features, which may include the settings or levels of feature use during vehicle operation. Information obtained by monitoring feature usage may be used to determine risk levels associated with vehicle operation, either generally or in relation to a vehicle operator. In such situations, total risk may be determined by a weighted combination of the risk levels associated with operation while autonomous operation features are enabled (with relevant settings) and the risk levels associated with operation while autonomous operation features are disabled. For fully autonomous vehicles, settings or configurations relating to vehicle operation may be monitored and used in determining vehicle operating risk.

In some embodiments, information regarding the risks associated with vehicle operation with and without the autonomous operation features may be used to determine risk categories or premiums for a vehicle insurance policy covering a vehicle with autonomous operation features, as described elsewhere herein. Risk category or price may be determined based upon factors relating to the evaluated effectiveness of the autonomous vehicle features. The risk or price determination may also include traditional factors, such as location, vehicle type, and level of vehicle use.

The vehicle 1350 may have various vehicle sensors 1352. The vehicle sensors 1352 may be any kind of sensors. Examples of the vehicle sensors 1352 include: cameras (e.g., for capturing images and/or video), light detection and ranging (LIDAR) cameras, radio detection and ranging (RADAR) devices, accelerometers, gyroscopes, compasses, speedometers, magnetometers, barometers, thermometers, proximity sensors, light sensors (e.g., light intensity detectors), electromagnetic radiation sensors (e.g., infrared and/or ultraviolet radiation sensors), ultrasonic and/or infrared range detectors, humistors, hygrometers, altimeters, microphones, audio or video recorders, etc. Additional examples vehicle sensors 1352 include advanced sensors, for example, that detect and/or receive data associated with temperature measurements, thermal imaging, weather conditions, traffic conditions, etc. The vehicle 1350 may include any number or combination of vehicle sensors 1352.

The vehicle 1350 may further include one or more processors 1351, such as one or more microprocessors, controllers, and/or any other suitable type of processor. The one or more processors 1351 may perform any functions. For example, the one or more processors 1351 may control the vehicle 1351 while it is driving in an autonomous or semi-autonomous mode. In another example, the one or more processors 1351 may switch the vehicle 1350 between manual, autonomous, and semi-autonomous modes. As will be discussed further below, the one or more processors 1351 may perform any of the functions of the VR feed generator application 1324 and/or the event determiner application 1326.

The vehicle 1350 may further include a smart windshield 1354. The smart windshield 1354 may be configured to produce a VR or augmented reality (AR) display, respectively, from a VR feed or AR feed.

The example of FIG. 13 also illustrates vehicle 1390, which, in some examples, may be a vehicle on a road traveling ahead of vehicle 1350. Similarly to the vehicle 1350, the vehicle 1390 may be an autonomous vehicle. The vehicle 1390 may also have sensors 1392, which may be any kind of sensors, such as those discussed above with respect to vehicle sensors 1352. The vehicle 1390 may also have one or more processors 1391, such as one or more microprocessors, controllers, and/or any other suitable type of processor. The one or more processors 1391 may perform any functions. For example, the one or more processors 1391 may control the vehicle 1390 while it is driving in an autonomous or semi-autonomous mode. In another example, the one or more processors 1391 may switch the vehicle 1390 between manual, autonomous, and semi-autonomous modes. It should be understood that the discussions above regarding autonomous vehicles, processors, and sensors with respect to vehicle 1350 apply also to vehicle 1390.

One or both of the vehicles 1350, 1390 may be in communication with smart infrastructure devices 1370. Examples of the smart infrastructure devices 1370 include road camera 1371, smart stoplight 1372, smart stop sign 1373, and infrastructure camera 1374. Any of the smart infrastructure devices 1370 may include any kind of sensors. For example, any of the smart infrastructure devices 1370 may include: cameras (e.g., for capturing images and/or video), light detection and ranging (LIDAR) cameras, radio detection and ranging (RADAR) devices, accelerometers, gyroscopes, compasses, speedometers, magnetometers, barometers, thermometers, proximity sensors, light sensors (e.g., light intensity detectors), electromagnetic radiation sensors (e.g., infrared and/or ultraviolet radiation sensors), ultrasonic and/or infrared range detectors, humistors, hygrometers, altimeters, microphones, audio or video recorders, thermal imaging devices, etc. Furthermore, any of the smart infrastructure devices 1370 may include multiple sensors (e.g., any combination of the example sensors just listed).

In some embodiments, the VR feed computing device 1302 receives the indication of the event occurring in a geographic area from drone 1395, which may be equipped with any kind of sensors. Examples of sensors that the drone 1395 may be equipped with include: cameras (e.g., for capturing images and/or video), light detection and ranging (LIDAR) cameras, radio detection and ranging (RADAR) devices, accelerometers, gyroscopes, compasses, speedometers, magnetometers, barometers, thermometers, proximity sensors, light sensors (e.g., light intensity detectors), electromagnetic radiation sensors (e.g., infrared and/or ultraviolet radiation sensors), ultrasonic and/or infrared range detectors, humistors, hygrometers, altimeters, microphones, audio or video recorders, thermal imaging devices, etc. Furthermore, the drone 1395 may include multiple sensors (e.g., any combination of the example sensors just listed).

The drone 1395 may also send data (e.g., generated by any of its sensors) to the VR feed computing device 1302 to be used for generating the VR feed.

In some embodiments, a VR feed generated by the VR computing device 1302 may be sent to an emergency response entity 1399. Examples of the emergency response entity 1399 include a police station, a fire station, a government office, a helicopter pad, etc.

Exemplary Presented VR Feeds

As previously mentioned, the one or more processors 1320 (or the one or more processors 1351) may generate a VR feed (e.g., in response to an indication of an event).

Figure 14:
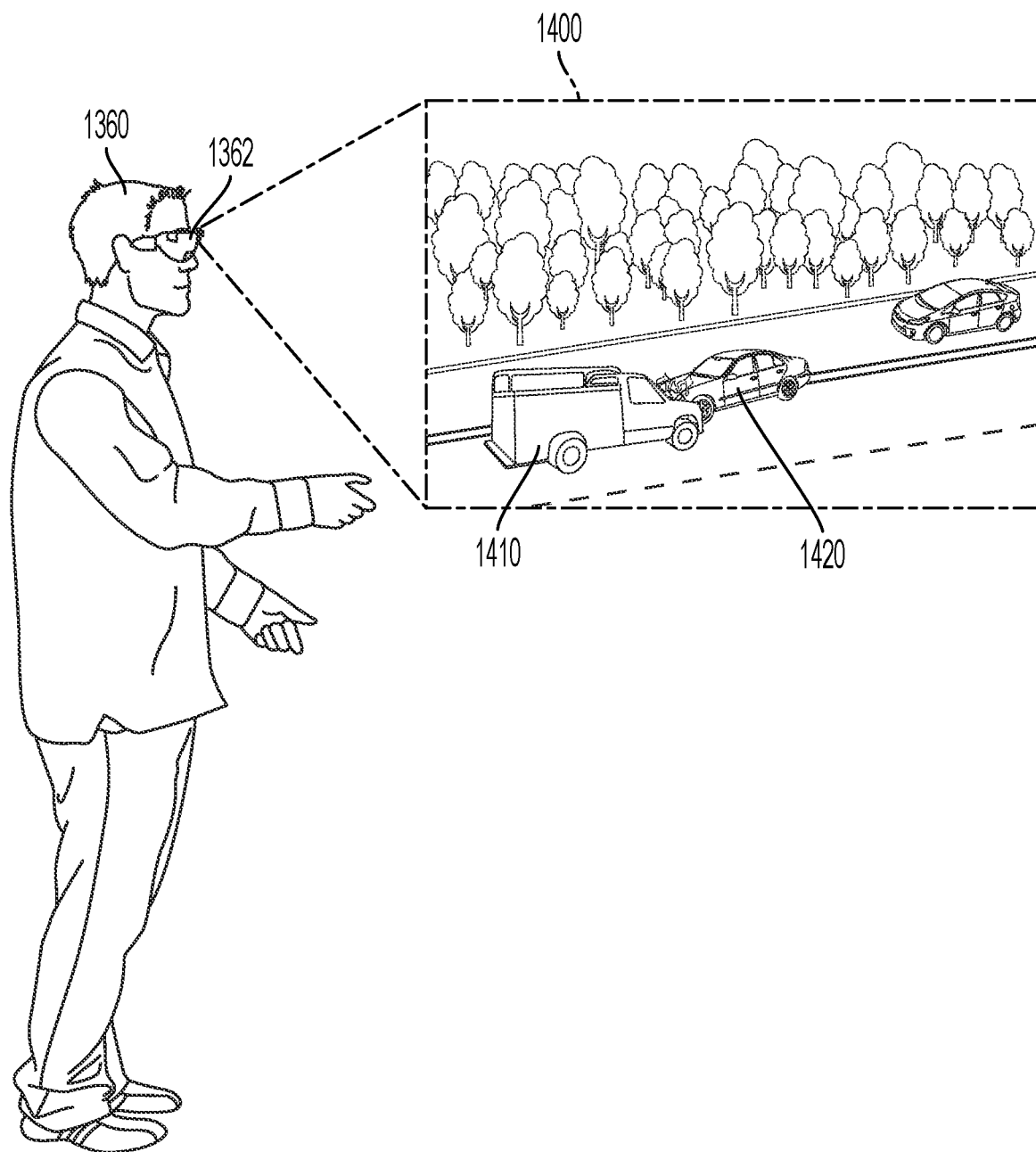
FIG. 14 shows an exemplary display of a VR feed including a vehicle collision event.

In this regard, FIG. 14 shows an exemplary display 1400 of a generated VR feed. More specifically, in this example, the event is a vehicle collision event; in particular, vehicle 1410 and vehicle 1420 have collided.

Figure 15:
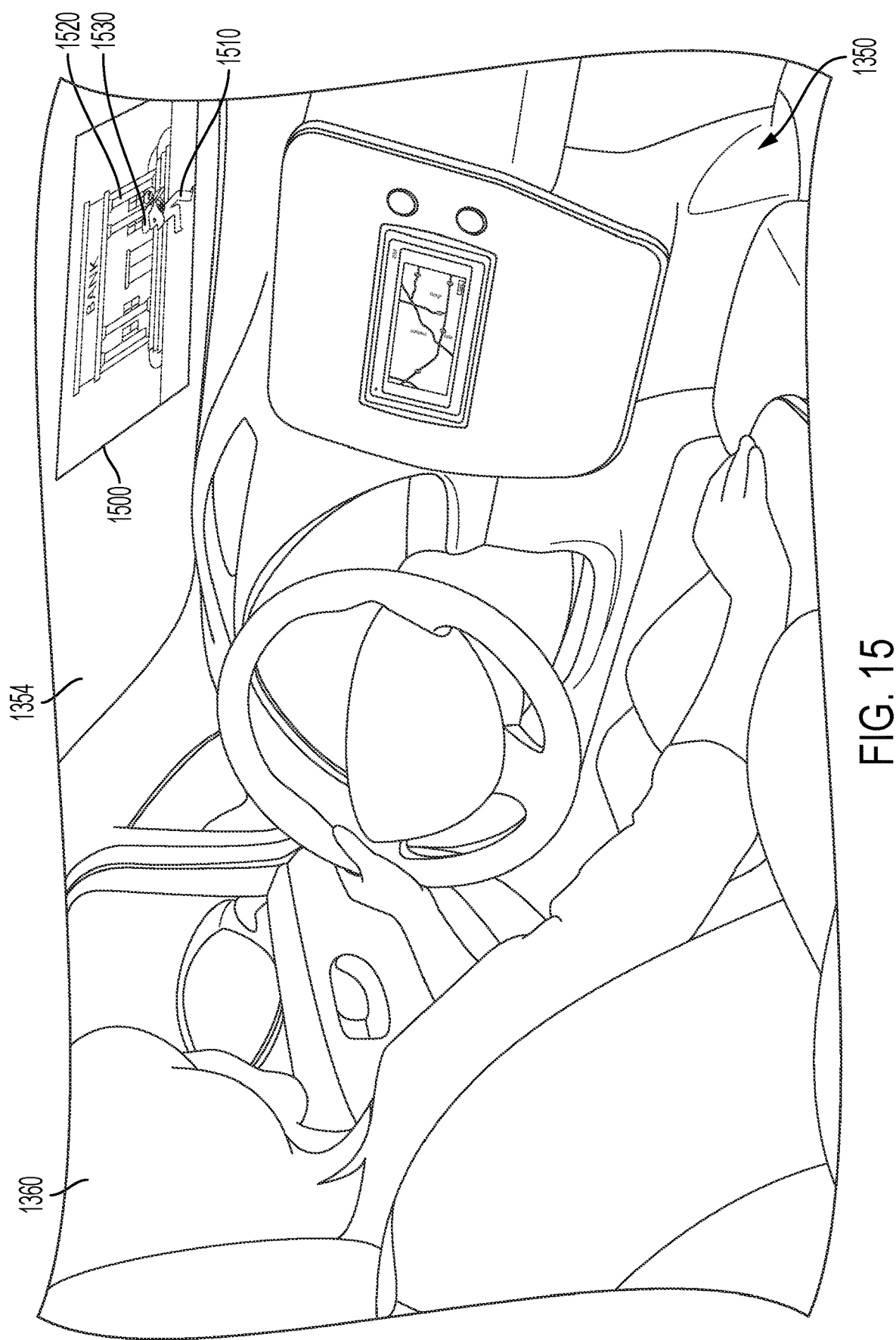
FIG. 15 shows an exemplary display of a VR feed including a crime event.

FIG. 15 shows an exemplary display 1500 of another generated VR feed. More specifically, in this example, the event is a crime event. In particular, burglar 1510 is running out of bank 1520 while carrying a stolen bag of money 1530. In the example of FIG. 15, the display 1500 is displayed on the smart windshield 1354.

Figure 16:
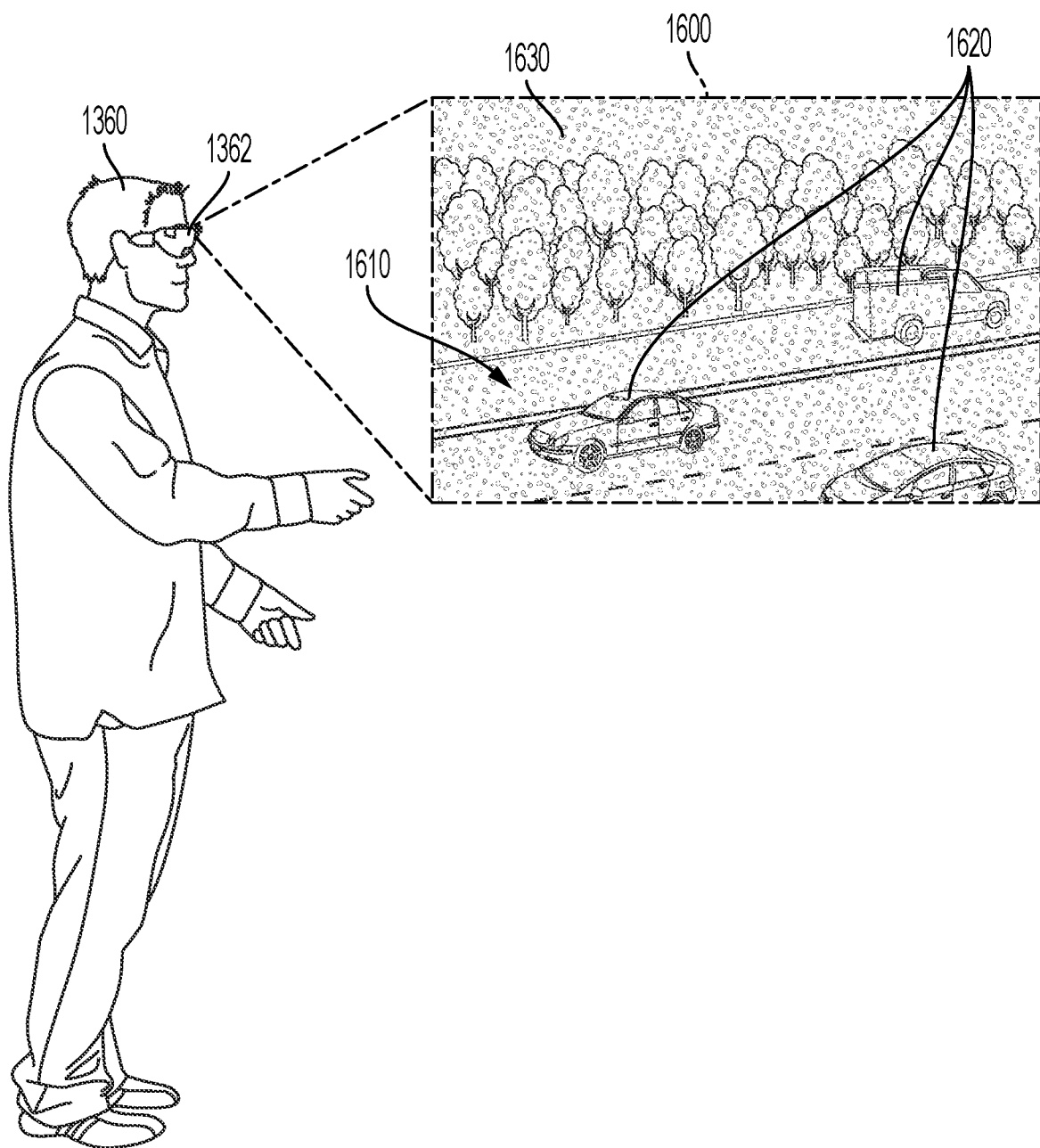
FIG. 16 shows an exemplary display of a VR feed including a weather event.

FIG. 16 shows an exemplary display 1600 of yet another generated VR feed. More specifically, in this example, the event is a weather event; in particular, a hail event. To further elaborate, the exemplary display 1600 shows a road 1610 occupied by vehicles 1620 with hail 1630 falling on them.

Figure 17:
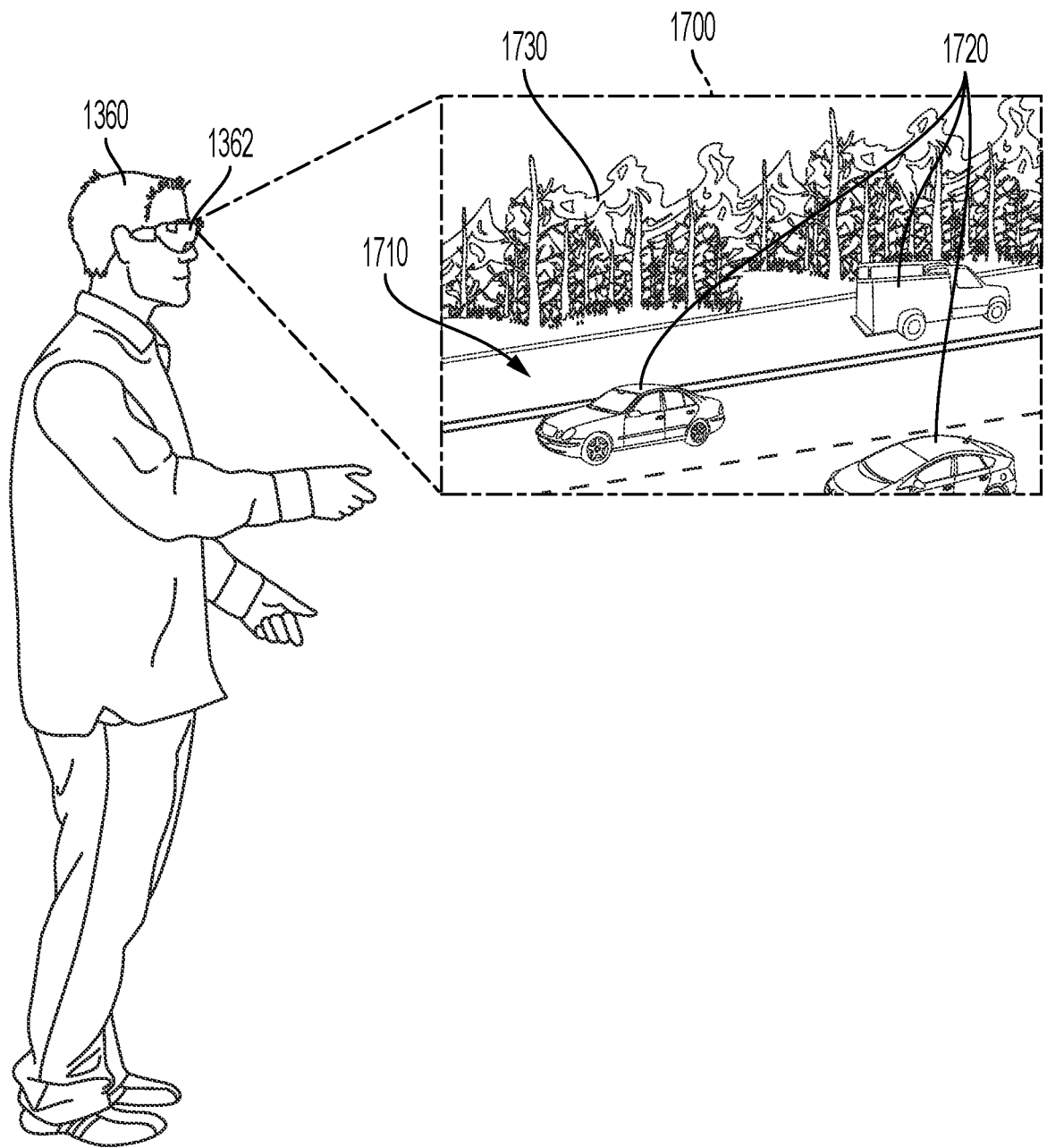
FIG. 17 shows an exemplary display of a VR feed including a natural disaster event.

FIG. 17 shows an exemplary display 1700 of another generated VR feed. More specifically, in this example, the event is a natural disaster event; in particular, a forest fire event. To further elaborate, the exemplary display 1700 shows a road 1710 with vehicles 1720 traveling through a forest fire 1730.

Furthermore, in some embodiments, and as will be described further below, the VR feed generator application 1324 may anonymize particular items in the VR feed. Examples of items that may be anonymized are a face of an individual, identifying information of an individual, and/or license plates.

Figure 18:
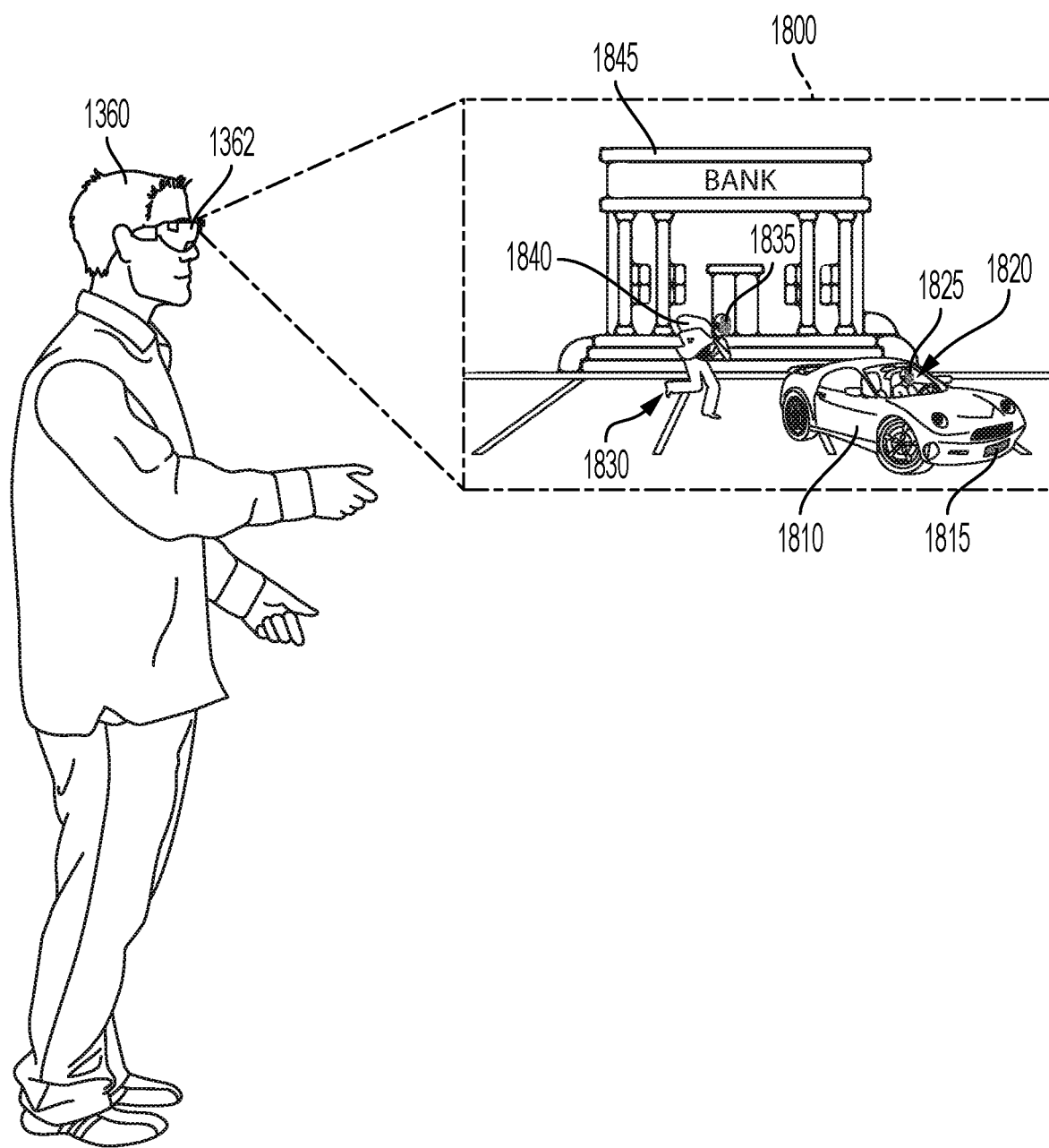
FIG. 18 shows an exemplary display of a VR feed where certain items are blurred out.

To this end, FIG. 18 illustrates an exemplary display 1800 of a generated VR feed, including anonymized items. In particular, in the illustrated example, the indicated event is a crime event. Vehicle 1810, driven by driver 1820, is being driven near a crime scene. In particular, a bank 1845 is being robbed by bank robber 1830, who is carrying a stolen bag of money 1840. To anonymize the data, the one or more processors 1320 have blurred out: (i) the face 1825 of the driver 1820, (ii) the face 1835 of the bank robber 1830, and/or (iii) the license plate 1815 of the vehicle 1810.

Figure 19:
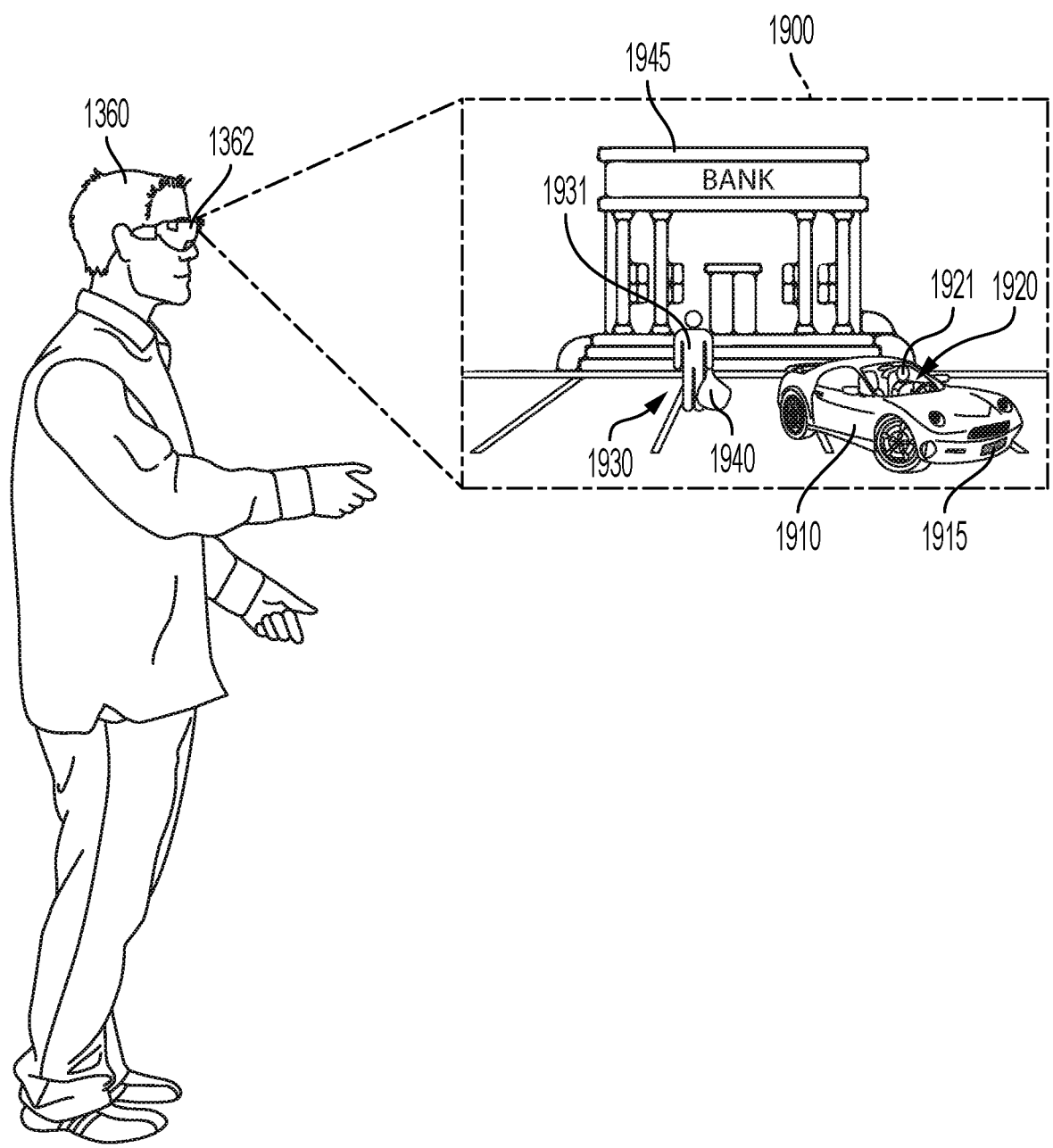
FIG. 19 shows an exemplary display of a VR feed where certain items are replaced with avatars.

In another example, rather than blurring out items, the items may be replaced with other items, such as avatars. In this regard, FIG. 19 shows an exemplary display 1900 relating to a crime event. In the illustrated example, vehicle 1910 is being driven by driver 1920 near a crime scene. In particular, a bank 1945 is being robbed by bank robber 1930, who is carrying a stolen bag of money 1940. To anonymize the identities of the driver 1920 and bank robber 1930, the driver 1920 has been replaced with avatar 1921, and the bank robber 1930 has been replaced with avatar 1931. The license plate 1915 has been blurred out.

Exemplary Methods for Generating a VR Feed Corresponding to an Event

Figure 20:
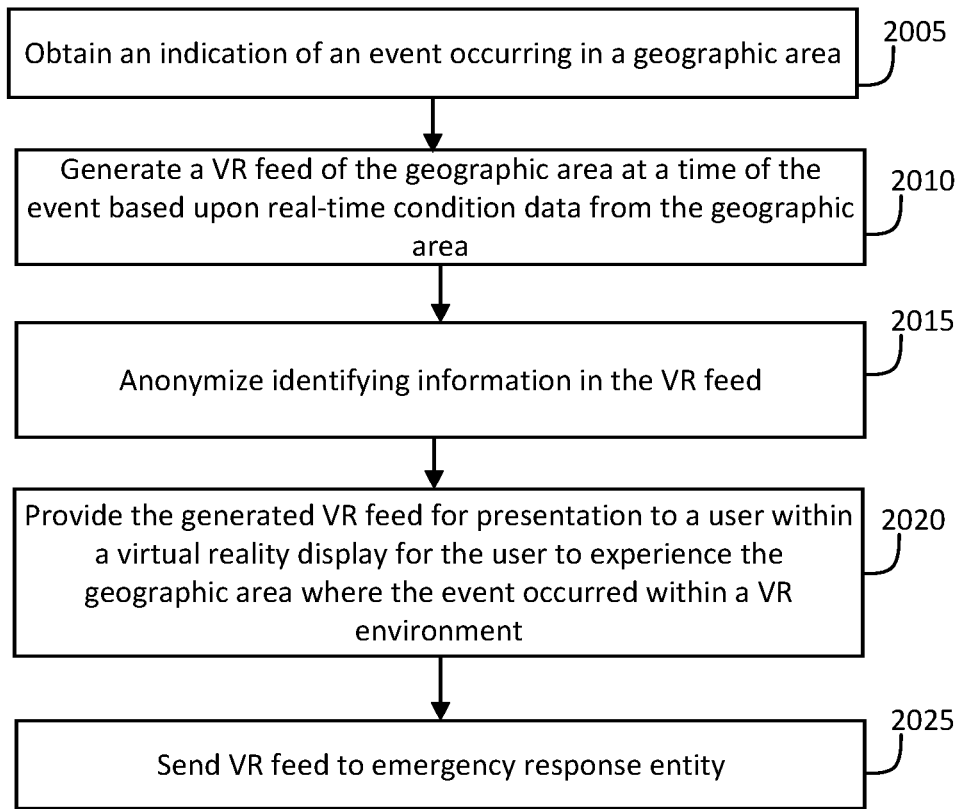
FIG. 20 illustrates a flow diagram of an exemplary computer-implemented method for generating a VR feed corresponding to an event.

FIG. 20 shows an exemplary implementation 2000 of generating a VR feed corresponding to an event. Although the following discussion refers to many of the blocks of the exemplary implementation 2000, as well as the exemplary implementation 2100 of FIG. 21, as being performed by the one or more processors 1320, it should be understood that any of the blocks or functions of the example implantations 2000, 2100 may be performed by either of the one or more processors 1320 of the VR feed computing device 1302, or the one or more processors 1351 of the vehicle 1350.

The exemplary implementation 2000 begins at block 2005 when the one or more processors 1320 obtain an indication of an event occurring in a geographic area. Examples of the event include a vehicle collision, a crime, a weather event, or a natural disaster.

The indication of the event may be obtained from any suitable source. For example, the indication may be obtained from: any of the smart infrastructure devices 1370 (e.g., road camera 1371, smart stoplight 1372, smart stop sign 1373, infrastructure camera 1374, etc.), a vehicle (e.g., vehicle 1390 and/or 1350), external database 1380, drone 1395, etc.

In some examples, these sources are continually monitoring for events. For example, a smart infrastructure device 1370 may be continuously analyzing data (e.g., imagery data) that it generates to determine if an event has occurred. If so, it sends an indication to the one or more processors 1320 that the event has occurred. The indication may also include the type of event.

In another example, the smart infrastructure devices do not analyze the data that they generate, and rather send their raw data (e.g., imagery data) to the one or more processors 1320. In these examples, the one or more processors 1320

(e.g., by using the event determiner application 1326) analyzes the raw data to determine that an event has occurred (e.g., thus the one or more processors 1320 analyze the data to obtain the indication that the event has occurred). The one or more processors 1320 may use any suitable technique to determine that the event has occurred. For example, any data sent to the one or more processors 1320, such as data sent from a smart infrastructure device 1370 and/or drone 1395, may be input into a trained machine learning algorithm to determine the event. Furthermore, the machine learning algorithm may have been trained by any suitable technique (e.g., supervised learning, unsupervised learning, semi-supervised learning). Examples of the machine learning algorithm may include neural networks, deep learning algorithms, etc.

In some examples, the geographic area corresponds to a geometric section on a map (e.g., a squares, a rectangle, a polygon, etc.) on the map. In other embodiments, the geographic area corresponds to a road (e.g., a section of road a quarter mile long). In other embodiments, the geographic area is based upon geographical boundaries (e.g., based upon neighborhoods, counties, communities, city boundaries, etc.).

At block 2010, the one or more processors 1320 generate a VR feed of the geographic area at a time of the event based upon real-time condition data from the geographic area. The real-time condition data may be obtained from any suitable source. For example, the real-time condition data may be obtained from any smart infrastructure device 1370 (e.g., road camera 1371, smart stoplight 1372, smart stop sign 1373, infrastructure camera 1374, etc.), external database 1380, sensors of a vehicle (e.g., vehicle sensors 1392), AR or VR headsets (e.g., camera(s) mounted on AR or VR headsets), drone 1395, etc. Examples of the real-time condition data include imagery data (e.g., image data, video data, LIDAR data, RADAR data, infrared data, etc.), audio data, weather data, traffic data, etc.

The generated VR feed may include a virtual representation of the geographic area at the time of the event to reflect the real-time conditions at the geographic area. In some embodiments, the VR feed is generated in response to obtaining the indication of the event.

In one example, vehicle 1390 is traveling ahead of vehicle 1350 on a route. The processors 1391 determine (e.g., from data from the vehicle sensors 1392) that a vehicle collision has occurred ahead of the vehicle 1390. The one or more processors 1320 may then obtain an indication that the event has occurred, and then generate a VR feed of the road segment based upon data received form the vehicle 1390 (and/or any other source, e.g., a smart infrastructure device 1370, the external database 1380, the drone 1395, etc.). Advantageously, generating the VR feed based upon data from multiple sources (e.g., cameras from multiple vehicles, a camera of a vehicle plus a smart infrastructure device 1370, etc.) creates a higher quality VR feed.

At block 2015, the one or more processors 1320 anonymize (or partially anonymize) identifying information (e.g., items that could potentially be used to identify an individual). For example, the one or more processors 1320 may first identify, in the VR feed, items that could be used to identify an individual; subsequently, the one or more processors 1320 may blur the identified items. Examples of items that could be used to identify an individual include a face of an individual, a body of an individual (e.g., a representation of the individual), items with identifying information (e.g., a name tag, a license plate, etc.), etc. In this regard, FIG. 18 shows an example display 1800 with faces 1825, 1835, and license plate 1815 all blurred out.

Alternatively to blurring, identified items may be replaced by objects, such as avatars. In this regard, FIG. 19 shows an example display 1900 with the body of driver 1920 replaced by avatar 1921, and the body of bank robber 1930 replaced with avatar 1931.

Such embodiments are particularly advantageous when the event is a crime event. For example, if a person depicted in a VR feed is a victim of a crime or a criminal suspect, it may be desirable to remove identifying information of the person. As such, in some embodiments, the one or more processors 1320 first determine the type of event; and then, if the event is a crime event, apply the blurring or replacement of the items. Furthermore, in some embodiments, if the type of event is a crime event, the one or more processors 1320 make a further determination of if an individual in the VR feed is a victim of a crime; and, if the individual is the victim of a crime, then the one or more processors 1320 performs the blurring or replacement of the items that could be used to identify the individual.

At block 2020, the one or more processors 1320 provide the generated VR feed for presentation to the user 1360 within a virtual reality display (e.g., the VR goggles 1362, the smart windshield 1354, etc.) for the user 1360 to experience the geographic area where the event occurred within a VR environment.

In some embodiments, the user 1320 experiences the VR environment by navigating through the VR environment. For example, if the VR display comprises the VR goggles 1362, the user 1320 may use the VR gloves 1363 to navigate through the VR environment. In another example, if the VR display comprises the smart windshield 1354, the user 1360 may use her smartphone, or a dashboard in the vehicle 1350 to navigate through the VR environment.

To this end, navigation though the VR environment is sometimes only possible if real-time condition data is obtained from more than one source. For example, if the real-time condition data is obtained only from a single road camera 1371, it might not be possible to navigate, in the VR environment, outside of a field of view (FOV) of the road camera 1371. Thus, in some embodiments, the one or more processors 1320 allow the user to navigate through the VR environment only if the real-time condition data comes from more than one source (e.g., a smart infrastructure device 1370 and a vehicle sensor 1392).

Furthermore, advantageously, the presentation may be improved if the real-time condition data comes from different kinds of sensors. For example, real-time condition data from a LIDAR camera (to provide superior depth information) may be combined with video information (to provide color information) to produce an improved presentation.

At block 2025, the one or more processors 1320 send the VR feed to an emergency response entity 1399. Examples of the emergency response entity 1399 include a police station, a fire station, a government office, a helicopter pad, etc.

Further, the one or more processors 1320 may indicate to the user 1360 that the VR feed has been sent to the emergency response entity 1399. For example, an indication indicating that the VR feed has been sent to the emergency response entity 1399 may be superimposed onto the VR feed that the user 1360 is viewing. The indication may also specify which emergency response entity 1399 the VR feed has been sent to (e.g., an indication indicating "VR feed sent to local police," "VR feed sent to state police," "VR feed sent to local fire station," etc.).

In addition, the feed sent to the emergency response entity 1399 may or may not have information anonymized. In one example, the VR feed experienced by the user 1320 has a suspect's face (as identified by the one or more processors 1320) blurred out, but the VR feed sent to the emergency response entity 1399 (e.g., a law enforcement agency) does not have the suspect's face blurred out.

Figure 21:
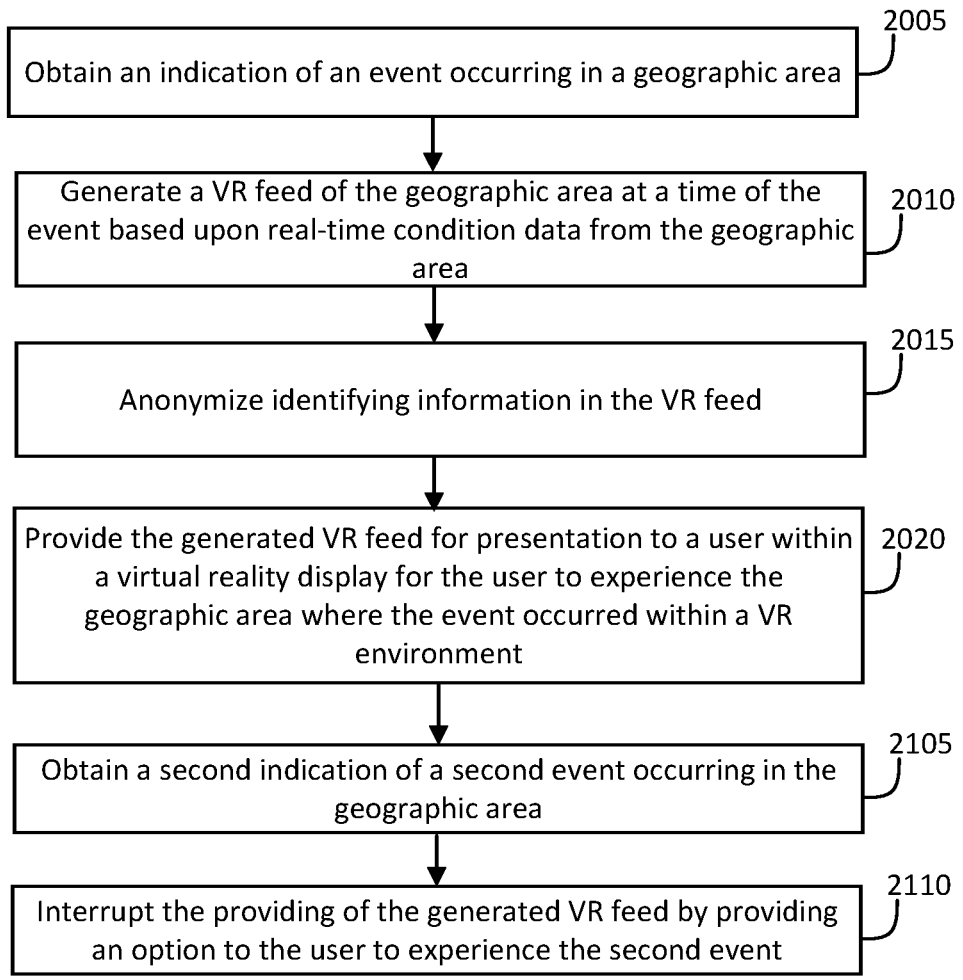
FIG. 21 illustrates a flow diagram of an exemplary computer-implemented method for generating a VR feed where a second event follows a first event.

FIG. 21 illustrates an exemplary implementation 2100, including an example where a second event occurs. With reference thereto, blocks 2005-2020 occur substantially as in the example of FIG. 20. It should be understood that the event referred to in blocks 2005-2020 of FIG. 21 is a first event, and the indication referred to in blocks 2005-2020 of FIG. 21 is a first indication.

At block 2105, the one or more processors 1320 obtain a second indication of a second event. The second indication may be obtained any way the first indication was obtained (e.g., at block 2005).

At block 2110, the one or more processors 1320 interrupt the providing of the generated VR feed by providing an option to the user to experience the second event.

The interruption may be provided by any suitable technique. For example, a visual message may be superimposed onto the VR feed. Examples of the messages include messages indicating: "A fire has been detected in the area. Would you like to experience the newly detected fire?" "Additional rain has been detected in the area. Would you like to change experiences to the newly detected rain?" etc.

In other examples of the visual message, the VR feed may be stopped, and the visual message (such as the example messages given above) may be displayed on the VR display, rather than superimposed onto the VR feed.

Additionally or alternatively, the interruption may be auditory. For example, a voice may read the words "A fire has been detected in the area. Would you like to experience the newly detected fire?" "Additional rain has been detected in the area. Would you like to change experiences to the newly detected rain?" etc. Advantageously, an interruption comprising an audio component, but not a visual component, may cause less of a disruption to the experience of the first event that the user 1360 is experiencing. However, it should be understood that the interruption may comprise both an audio and a visual component.

It should be understood that not all blocks of the exemplary flowcharts 500, 600, 1000, 1100, 1200, 2000, 2100 are required to be performed. Moreover, the exemplary flowcharts 500, 600, 1000, 1100, 1200, 2000, 2100 are not mutually exclusive (e.g., block(s) from each example flowchart 500, 600, 1000, 1100, 1200, 2000, 2100 may be performed in any other flowchart). The exemplary flowcharts may include additional, less, or alternate functionality, including that discussed elsewhere herein.

Applicability to the Insurance Industry

Some embodiments have particular applicability to the insurance industry. For example, discounts to insurance premiums may be provided by the techniques described herein. For instance, if a user 1360 agrees to allow her vehicle to send real-time condition data (e.g., to the external database 1380, thereby allowing others to preview severe weather and/or other dangerous conditions), the user 1360 may receive a discount on an insurance premium.

In one aspect, data from the vehicle 1350, and/or other data, including the types of data discussed elsewhere herein, may be collected or received by an insurance provider remote server, such as via direct or indirect wireless communication or data transmission from a smart home controller, mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to autonomous vehicles.

Exemplary Use of Generating a VR Feed Corresponding to an Event

In one aspect, a computer-implemented method for generating a virtual reality (VR) feed corresponding to an event may be provided. The method may include: (1) obtaining, via one or more processors, an indication of an event occurring in a geographic area, wherein the event is at least one of: a vehicle collision, a crime, a weather event, or a natural disaster; (2) generating, via the one or more processors, a VR feed of the geographic area at a time of the event based upon real-time condition data from the geographic area, the VR feed including a virtual representation of the geographic area at the time of the event to reflect the real-time conditions at the geographic area; and/or (3) providing, via the one or more processors, the generated VR feed for presentation to a user within a virtual reality display for the user to experience the geographic area where the event occurred within a VR environment. The method may include additional, fewer, or alternate actions, including those discussed elsewhere herein.

In some embodiments, the VR feed may be generated based upon data generated by: (i) a camera of a vehicle in the geographic area, (ii) a drone in the geographic area, and/or (iii) an infrastructure camera in the geographic area.

In certain embodiments, the event may be the vehicle collision; the indication may be obtained from a vehicle in the geographic area; and/or the VR feed may be generated based upon data received from a vehicle camera of the vehicle in the geographic area.

In some embodiments, the indication may be a first indication, the event may be a first event, and/or the method may further include: obtaining, via the one or more processors, a second indication of a second event occurring in the geographic area; and/or interrupting, via the one or more processors, the providing of the generated VR feed by providing an option to the user to experience the second event.

Additionally or alternatively, generating the VR feed may further comprise blurring out: a face of an individual, identifying information of an individual, and/or a license plate. In some embodiments, generating the VR feed may further include identifying, via the one or more processors, a representation of an individual in the virtual representation of the geographic area, and/or replacing the representation of the individual with an avatar.

The method may further include sending, via the one or more processors and to an emergency response entity, the virtual representation of the geographic area including the representation of the individual. In some embodiments, the event may include the natural disaster event, and/or the natural disaster event may comprise a forest fire, or a hurricane.

In another aspect, a computer system configured to generate a virtual reality (VR) feed corresponding to an event may be provided. The computer system may include one or more local or remote processors, transceivers, and/or sensors configured to: (1) obtain an indication of an event occurring in a geographic area, wherein the event is at least one of: a vehicle collision, a crime, a weather event, or a natural disaster; (2) generate a VR feed of the geographic area at a time of the event based upon real-time condition data from the geographic area, the VR feed including a virtual representation of the geographic area at the time of the event to reflect the real-time conditions at the geographic area; and/or (3) provide the generated VR feed for presentation to a user within a virtual reality display for the user to experience the geographic area where the event occurred within a VR environment. The computer system may include additional, less, or alternate functionality, including that discussed elsewhere herein.

For instance, the VR feed may be generated based upon data generated by: (i) a camera of a vehicle in the geographic area, (ii) a drone in the geographic area, and/or (iii) an infrastructure camera in the geographic area. In some embodiments, the event may be the vehicle collision; the indication may be obtained from a vehicle in the geographic area; and/or the VR feed may be generated based upon data received from a vehicle camera of the vehicle in the geographic area.

In some embodiments, the indication may be a first indication, the event may be a first event, and/or the one or more local or remote processors, transceivers, and/or sensors may be further configured to: obtain a second indication of a second event occurring in the geographic area; and/or interrupt the providing of the generated VR feed by providing an option to the user to experience the second event.

Generating the VR feed may further include blurring out: a face of an individual, identifying information of an individual, and/or a license plate. In some embodiments, the event may include the natural disaster event, and the natural disaster event may comprise a forest fire, or a hurricane.

In yet another aspect, a computer device for generating a virtual reality (VR) feed corresponding to an event may be provided. The computer device may include: one or more processors; and one or more memories coupled to the one or more processors. The one or more memories including computer executable instructions stored therein that, when executed by the one or more processors, may cause the one or more processors to: (1) obtain an indication of an event occurring in a geographic area, wherein the event is at least one of: a vehicle collision, a crime, a weather event, or a natural disaster; (2) generate a VR feed of the geographic area at a time of the event based upon real-time condition data from the geographic area, the VR feed including a virtual representation of the geographic area at the time of the event to reflect the real-time conditions at the geographic area; and/or (3) provide the generated VR feed for presentation to a user within a virtual reality display for the user to experience the geographic area where the event occurred within a VR environment. The computer device may include additional, less, or alternate functionality, including that discussed elsewhere herein.

For instance, the VR feed may be generated based upon data generated by: (i) a camera of a vehicle in the geographic area, (ii) a drone in the geographic area, and/or (iii) an infrastructure camera in the geographic area. In some embodiments: the event may be the vehicle collision; the indication may be obtained from a vehicle in the geographic area; and/or the VR feed may be generated based upon data received from a vehicle camera of the vehicle in the geographic area.

In some embodiments, the indication may be a first indication, the event may be a first event, and/or wherein the one or more memories including computer executable instructions stored therein that, when executed by the one or more processors, may further cause the one or more processors to: obtain a second indication of a second event occurring in the geographic area; and/or interrupt the providing of the generated VR feed by providing an option to the user to experience the second event.

Generating the VR feed may further include blurring out: a face of an individual, identifying information of an individual, and/or a license plate. In some embodiments, the event may include the natural disaster event, and/or the natural disaster event may comprise a forest fire, or a hurricane.

Other Matters

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Upon reading this disclosure, those of skill in the art will appreciate still additional alternative structural and functional designs for the approaches described herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

Furthermore, the patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed:

1. A computer-implemented method for generating a virtual reality (VR) feed corresponding to an event, the method comprising:
   obtaining, via one or more processors, an indication of an event occurring in a geographic area, wherein the event is at least one of: a vehicle collision, a crime, a weather event, or a natural disaster;
   generating, via the one or more processors, a VR feed of the geographic area at a time of the event based upon real-time condition data from the geographic area, the VR feed including a virtual representation of the geographic area at the time of the event to reflect the real-time conditions at the geographic area; and
   providing, via the one or more processors, the generated VR feed for presentation to a user within a virtual reality display for the user to experience the geographic area where the event occurred within a VR environment;
   wherein the indication is a first indication, the event is a first event, and the method further includes:
   obtaining, via the one or more processors, a second indication of a second event occurring in the geographic area; and
   interrupting, via the one or more processors, the providing of the generated VR feed by providing an option to the user to experience the second event.

2. The computer-implemented method of claim 1, wherein the VR feed is generated based upon data generated by: (i) a camera of a vehicle in the geographic area, (ii) a drone in the geographic area, and/or (iii) an infrastructure camera in the geographic area.

3. The computer-implemented method of claim 1, wherein:
   the event is the vehicle collision;
   the indication is obtained from a vehicle in the geographic area; and
   the VR feed is generated based upon data received from a vehicle camera of the vehicle in the geographic area.

4. The computer-implemented method of claim 1, wherein generating the VR feed further comprises blurring out: a face of an individual, identifying information of an individual, and/or a license plate.

5. The computer-implemented method of claim 1, wherein generating the VR feed further comprises identifying, via the one or more processors, a representation of an individual in the virtual representation of the geographic area, and replacing the representation of the individual with an avatar.

6. The computer-implemented method of claim 5, further comprising:
   sending, via the one or more processors and to an emergency response entity, the virtual representation of the geographic area including the representation of the individual.

7. The computer-implemented method of claim 1, wherein: the event comprises the natural disaster event, and the natural disaster event comprises a forest fire, or a hurricane.

8. A computer system configured to generate a virtual reality (VR) feed corresponding to an event, the computer system comprising one or more local or remote processors, transceivers, and/or sensors configured to:
   obtain an indication of an event occurring in a geographic area, wherein the event is at least one of: a vehicle collision, a crime, a weather event, or a natural disaster;
   generate a VR feed of the geographic area at a time of the event based upon real-time condition data from the geographic area, the VR feed including a virtual representation of the geographic area at the time of the event to reflect the real-time conditions at the geographic area; and
   provide the generated VR feed for presentation to a user within a virtual reality display for the user to experience the geographic area where the event occurred within a VR environment;
   wherein the indication is a first indication, the event is a first event, and the one or more local or remote processors, transceivers, and/or sensors are further configured to:
   obtain a second indication of a second event occurring in the geographic area; and
   interrupt the providing of the generated VR feed by providing an option to the user to experience the second event.

9. The computer system of claim 8, wherein the VR feed is generated based upon data generated by: (i) a camera of a vehicle in the geographic area, (ii) a drone in the geographic area, and/or (iii) an infrastructure camera in the geographic area.

10. The computer system of claim 8, wherein:
    the event is the vehicle collision;
    the indication is obtained from a vehicle in the geographic area; and
    the VR feed is generated based upon data received from a vehicle camera of the vehicle in the geographic area.

11. The computer system of claim 8, wherein generating the VR feed further comprises blurring out: a face of an individual, identifying information of an individual, and/or a license plate.

12. The computer system of claim 8, wherein: the event comprises the natural disaster event, and the natural disaster event comprises a forest fire, or a hurricane.

13. A computer device for generating a virtual reality (VR) feed corresponding to an event, the computer device comprising:

one or more processors; and one or more non-transitory memories coupled to the one or more processors;

the one or more non-transitory memories including computer executable instructions stored therein that, when executed by the one or more processors, cause the one or more processors to:

obtain an indication of an event occurring in a geographic area, wherein the event is at least one of: a vehicle collision, a crime, a weather event, or a natural disaster;

generate a VR feed of the geographic area at a time of the event based upon real-time condition data from the geographic area, the VR feed including a virtual representation of the geographic area at the time of the event to reflect the real-time conditions at the geographic area, wherein the generate the VR feed further includes identifying a representation of an individual in the virtual representation of the geographic area, and replacing the representation of the individual with an avatar; and provide the generated VR feed for presentation to a user within a virtual reality display for the user to experience the geographic area where the event occurred within a VR environment;

wherein the one or more memories including computer executable instructions stored therein that, when executed by the one or more processors, further cause the one or more processors to send, to an emergency response entity, the virtual representation of the geographic area including the representation of the individual.

14. The computer device of claim 13, wherein the VR feed is generated based upon data generated by: (i) a camera of a vehicle in the geographic area, (ii) a drone in the geographic area, and/or (iii) an infrastructure camera in the geographic area.

15. The computer device of claim 13, wherein:

the event is the vehicle collision;

the indication is obtained from a vehicle in the geographic area; and the VR feed is generated based upon data received from a vehicle camera of the vehicle in the geographic area.

16. The computer device of claim 13, wherein the indication is a first indication, the event is a first event, and wherein the one or more non-transitory memories including computer executable instructions stored therein that, when executed by the one or more processors, further cause the one or more processors to:

obtain a second indication of a second event occurring in the geographic area; and interrupt the providing of the generated VR feed by providing an option to the user to experience the second event.

17. The computer device of claim 13, wherein generating the VR feed further comprises blurring out: identifying information of the individual, and/or a license plate.

18. The computer device of claim 13, wherein: the event comprises the natural disaster event, and the natural disaster event comprises a forest fire, or a hurricane.

\* \* \* \* \*